(12) United States Patent
Yajima

(10) Patent No.: US 12,412,439 B2
(45) Date of Patent: Sep. 9, 2025

(54) GATE APPARATUS

(71) Applicant: FAST RETAILING CO., LTD., Yamaguchi (JP)

(72) Inventor: Muneharu Yajima, Yamaguchi (JP)

(73) Assignee: FAST RETAILING CO., LTD., Yamaguchi (JP)

( * ) Notice: Subject to any disclaimer, the term of this patent is extended or adjusted under 35 U.S.C. 154(b) by 0 days.

(21) Appl. No.: 18/683,991

(22) PCT Filed: Aug. 27, 2021

(86) PCT No.: PCT/JP2021/031611
§ 371 (c)(1),
(2) Date: Feb. 15, 2024

(87) PCT Pub. No.: WO2023/026495
PCT Pub. Date: Mar. 2, 2023

(65) Prior Publication Data
US 2024/0428633 A1    Dec. 26, 2024

(51) Int. Cl.
*G07C 9/10* (2020.01)
*G06K 7/10* (2006.01)

(52) U.S. Cl.
CPC .......... *G07C 9/10* (2020.01); *G06K 7/10297* (2013.01)

(58) Field of Classification Search
CPC .............................. G07C 9/10; G06K 7/10297
(Continued)

(56) References Cited

U.S. PATENT DOCUMENTS 7,284,698 B2 * 10/2007 Sogo ...................... G07C 9/257
235/382
9,959,439 B1 * 5/2018 Lui .................... G06Q 10/0833
(Continued)

FOREIGN PATENT DOCUMENTS

JP    2008-171052 A    7/2008
JP    2019-086832 A    6/2019
(Continued)

OTHER PUBLICATIONS

International Search Report issued in corresponding International Application No. PCT/JP2021/031611 dated Oct. 19, 2021, pp. 1-2, English Translation.

*Primary Examiner* — Ahshik Kim
(74) *Attorney, Agent, or Firm* — Carter, DeLuca & Farrell LLP

(57) ABSTRACT

To provide a gate apparatus through which a user can efficiently pass.
A gate apparatus is communicatively connected to an information processing apparatus including a first reading unit that reads a store leaving code to acquire first identification information for individually identifying a product for which a payment process has been completed. The gate apparatus includes a pair of side wall portions that are disposed to face each other with a passage interposed therebetween, a second reading unit that is provided on at least one of the pair of side wall portions and outputs predetermined radio waves to read, from an RFID tag attached to the product, second identification information for individually identifying a product that has passed through the passage, and a placement portion on which the information processing apparatus is placed. The placement portion is disposed above a reading region of the second reading unit.

9 Claims, 21 Drawing Sheets

(58) Field of Classification Search
USPC .......................................................... 235/382
See application file for complete search history.

(56) References Cited

U.S. PATENT DOCUMENTS

| | | | |
|---|---|---|---|
| 11,132,737 B2* | 9/2021 | Glaser | G06Q 30/0635 |
| 11,205,166 B2 | 12/2021 | Imamura | |
| 11,651,664 B2* | 5/2023 | Khojastepour | G06Q 20/208 |
| | | | 705/17 |
| 2011/0001606 A1* | 1/2011 | Charych | G07C 9/28 |
| | | | 235/382 |
| 2013/0080279 A1* | 3/2013 | Daily | G07G 1/009 |
| | | | 705/23 |
| 2019/0244161 A1* | 8/2019 | Abhishek | G06Q 30/0639 |
| 2020/0258070 A1 | 8/2020 | Fujisawa | |
| 2021/0150505 A1* | 5/2021 | Kumagawa | G06Q 30/06 |
| 2022/0114871 A1* | 4/2022 | Lau | G08B 29/188 |
| 2022/0262220 A1* | 8/2022 | Shah | G08B 13/2474 |
| 2023/0187811 A1* | 6/2023 | Cohen | H01Q 1/2225 |
| | | | 343/702 |

FOREIGN PATENT DOCUMENTS

| | | |
|---|---|---|
| JP | 2019-121251 A | 7/2019 |
| WO | 2019/049953 A1 | 3/2019 |

* cited by examiner

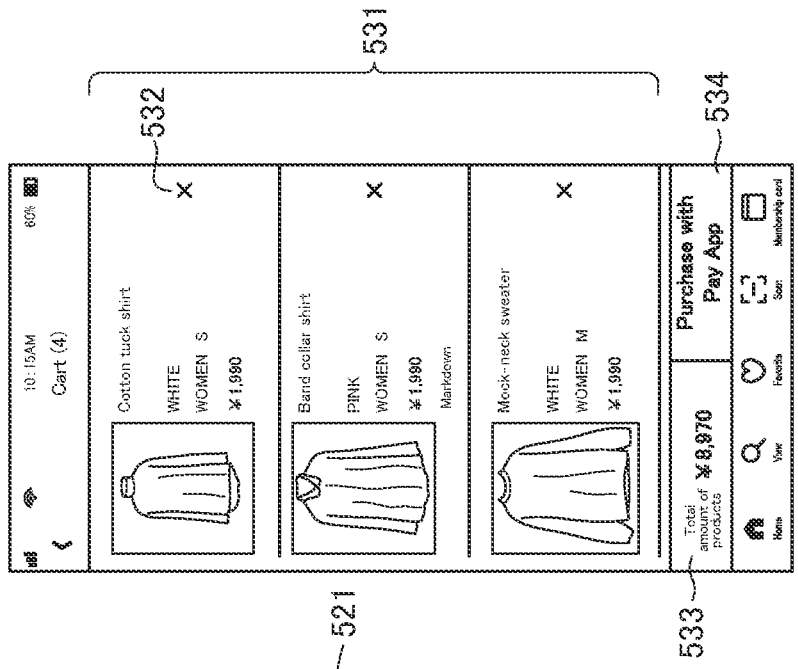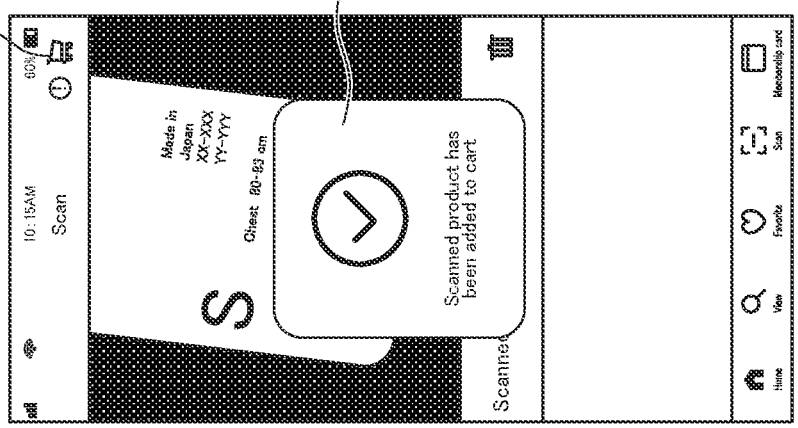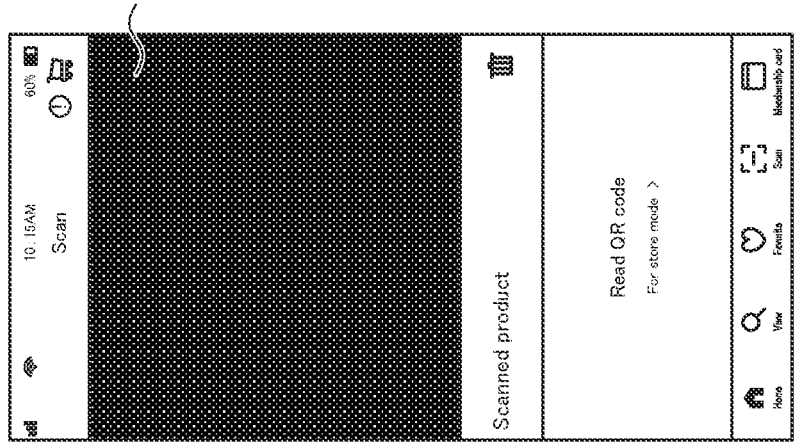

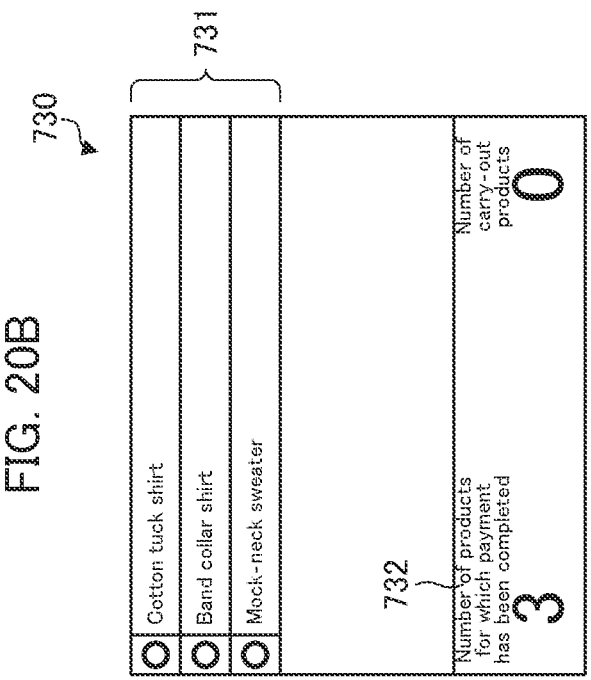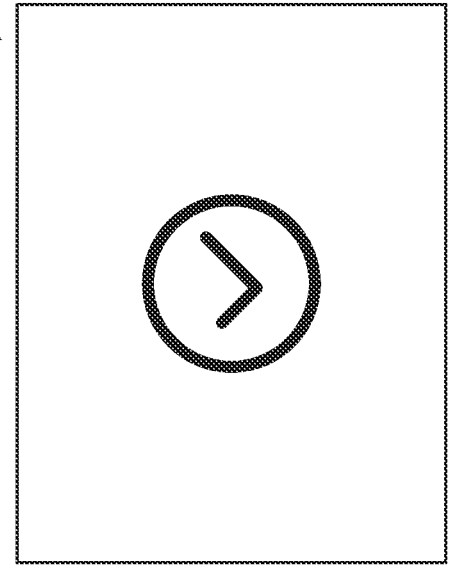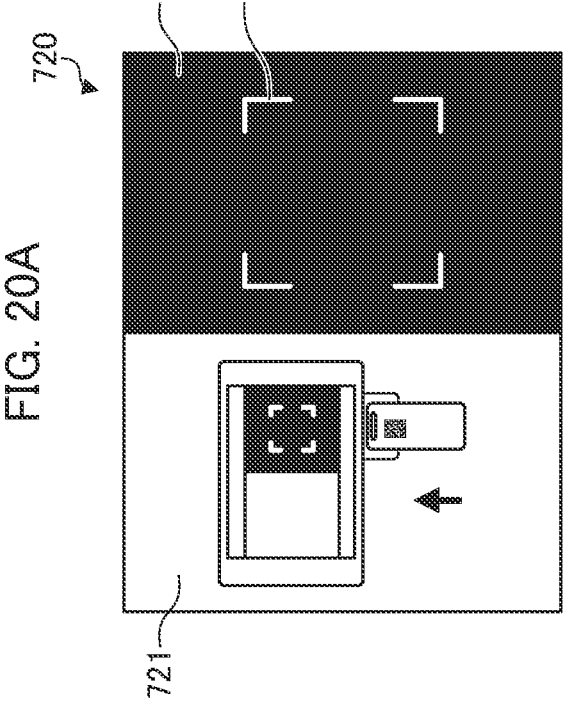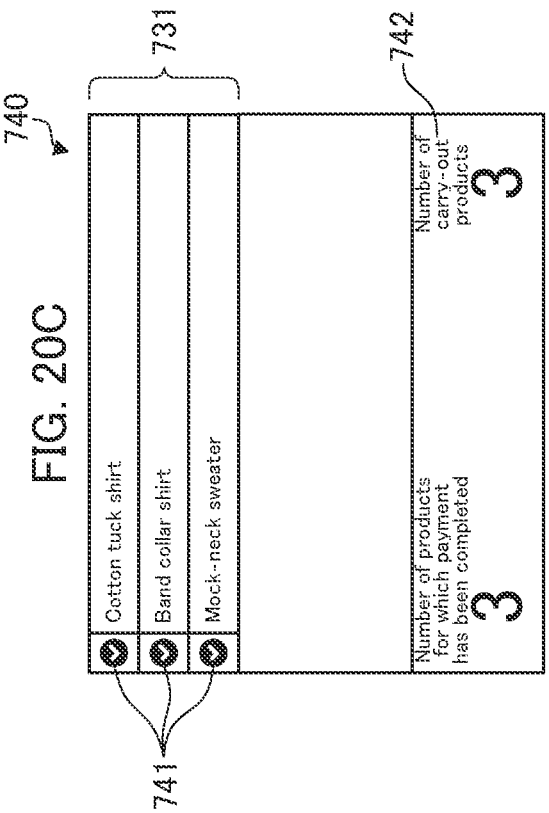

FIG. 21

|  | Code (payment) information | | RFID reading information | | Collation result | Error notification |
|---|---|---|---|---|---|---|
|  | Total number of products | Identification information | Total number of products | Identification information | | |
| Pattern 1 | 3 | A 001<br>B 001<br>C 001 | 3 | A 001<br>B 001<br>C 001 | Normal | No |
| Pattern 2 | 3 | A 001<br>B 001<br>C 001 | 2 | A 001<br>B 001 | Error | Number of products is not sufficient. Please check product. |
| Pattern 3 | 3 | A 001<br>B 001<br>C 001 | 4 | A 001<br>B 001<br>C 001<br>C 002 | Error | You seem to have something other than product for which payment has been made. Staff member will be called and please check. |
| Pattern 4 | 3 | A 001<br>B 001<br>C 001 | 3 | A 001<br>B 001<br>D 001 | Error | You seem to have something other than product for which payment has been made. Staff member will be called and please check. |
| Pattern 5 | 3 | A 001<br>B 001<br>C 001 | 3 | A 001<br>B 001<br>C 002 | Normal | No |

GATE APPARATUS

CROSS REFERENCE TO RELATED APPLICATIONS

The present application is a national stage application of International Application No. PCT/JP2021/031611, filed Aug. 27, 2021, the entire content of which is hereby incorporated by reference herein in its entirety.

TECHNICAL FIELD

The present invention relates to a gate apparatus.

BACKGROUND ART

There is a technique of managing entrance and exit into and from a store or a ticket gate by using a gate apparatus including a two-dimensional barcode reader. In such a technique, the barcode reader is disposed on the entrance side of the gate apparatus (Patent Literature 1).

CITATION LIST

Patent Literature

Patent Literature 1: JP 2008-171052 A

SUMMARY OF INVENTION

Technical Problem

However, in the gate apparatus as disclosed in Patent Literature 1, in a case where an approval result of entrance/exit is displayed, a user needs to stop near the entrance of the gate apparatus once in order to cause the gate apparatus to read the barcode, and further needs to stop again at a position where the approval result is displayed. Therefore, the user needs to stop a plurality of times in order to pass through the gate apparatus.

An object of the present invention is to provide, for example, a gate apparatus through which a user can efficiently pass.

Solution to Problem

In order to solve the above problem, an embodiment of the present invention is a gate apparatus communicatively connected to an information processing apparatus including a first reading unit that reads a store leaving code to acquire first identification information capable of individually identifying a product for which a payment process has been completed, the gate apparatus including: a pair of side wall portions disposed opposite to each other across a passage; a second reading unit that is provided on at least one of the pair of side wall portions and outputs a predetermined radio wave to read, from an RFID tag attached to the product, second identification information capable of individually identifying the product having passed through the passage; and a placement portion on which the information processing apparatus is placed, in which the placement portion is disposed above a reading region of the second reading unit.

Advantageous Effects of Invention

According to the present invention, it is possible to provide a gate apparatus through which a user can efficiently pass.

BRIEF DESCRIPTION OF DRAWINGS

FIGS. 13A-13C are diagrams illustrating an example of a display screen at the time of selecting a product.

FIGS. 20A-20D are diagrams illustrating an example of a display screen of the information processing apparatus at the time of the store leaving process.

FIG. 21 is a diagram for describing a collation result in S707.

DESCRIPTION OF EMBODIMENTS

<Purchase Support System>

Hereinafter, embodiments of the present invention will be described with reference to the drawings.

Figure 1:
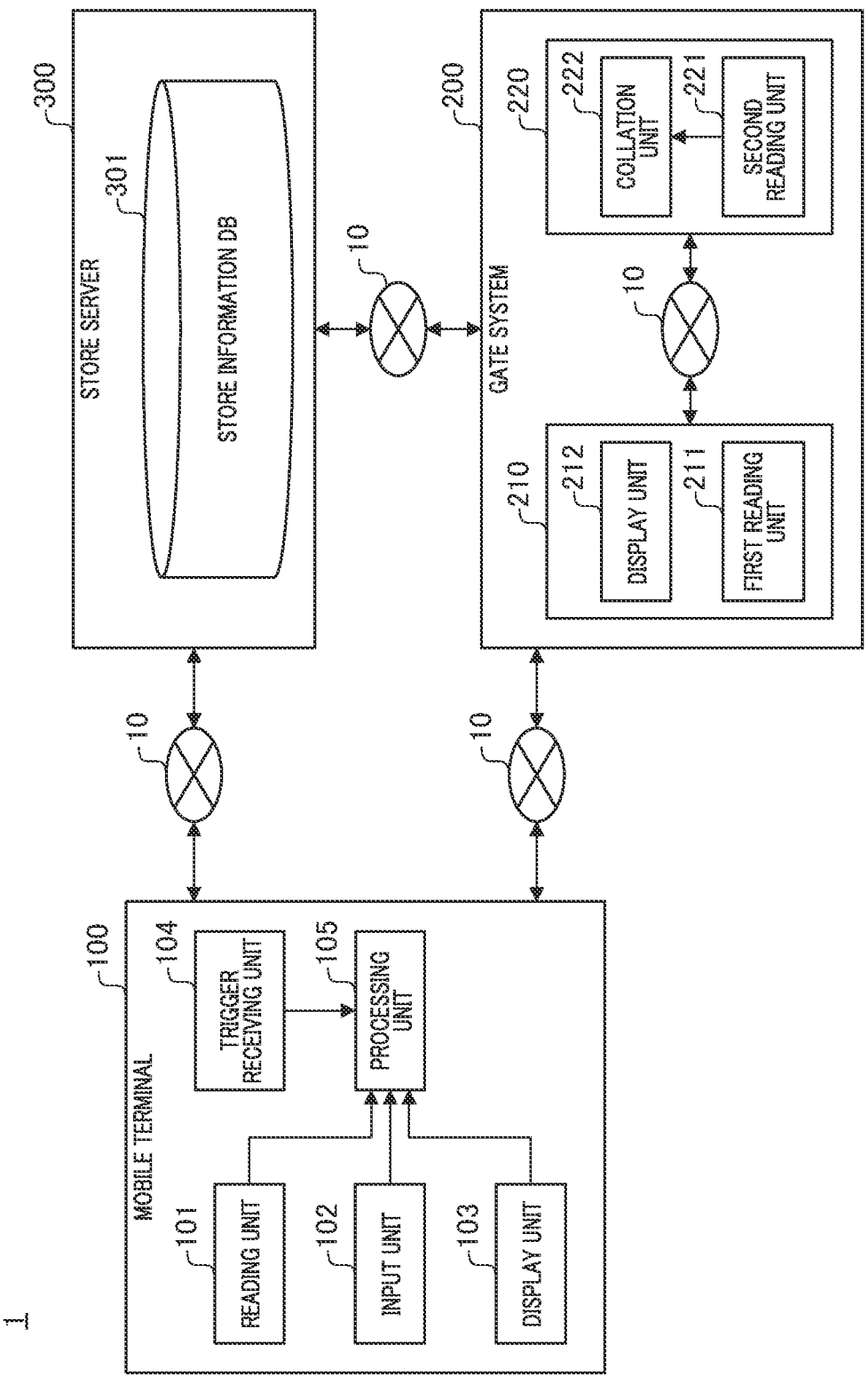
FIG. 1 is a configuration diagram illustrating an example of a configuration of a purchase support system according to an embodiment.

FIG. 1 is a configuration diagram illustrating an example of a configuration of a purchase support system 1 according to an embodiment. The purchase support system 1 includes a mobile terminal 100, a gate system 200, and a store server 300. The mobile terminal 100, the gate system 200, and the store server 300 are communicatively connected via a network 10. The network 10 includes, for example, the Internet, a wide area network (WAN), a local area network (LAN), a wireless base station such as WiFi, a provider device, and a dedicated line. The purchase support system 1 is, for example, a system that supports purchase of customers in clothing stores, grocery stores, and daily necessities stores. In the present embodiment, an example of supporting purchase in a clothing store will be described.

The mobile terminal 100 includes a reading unit 101, an input unit 102, a display unit 103, a trigger receiving unit 104, and a processing unit 105. The mobile terminal 100 is, for example, an information processing apparatus such as a smartphone, a tablet terminal, or a mobile phone owned by a customer who is a user. An application operating on the mobile terminal 100 can execute a normal mode for supporting purchase through mail order (for example, e-commerce or network mail order) and a store mode for supporting purchase in a real store. In the normal mode, a product can be purchased through the Internet. That is, it is possible to purchase products sold via Internet mail order such as network mail order, e-commerce, or EC. In the store mode, when a product is purchased in a real store, a payment process for the product can be performed by using an application operating on the mobile terminal 100.

The reading unit 101 is, for example, a camera (imaging unit) included in a smartphone, and images a two-dimensional code written on a tag attached to a product such as a QR code (trademark). The reading unit 101 images the two-dimensional code and interprets the two-dimensional code according to a predetermined procedure to extract code information included in the two-dimensional code.

The input unit 102 is, for example, a touch panel or an input button that receives an operation input from a user. When the user inputs an instruction or the like by using the input unit 102, the mobile terminal 100 receives the instruction or the like from the user.

The display unit 103 is, for example, a liquid crystal display panel, a plasma display panel, or an organic EL display panel, and is controlled by a central processing unit (CPU) included in the mobile terminal 100. The display unit 103 displays a predetermined screen under the control of the CPU. Note that, for example, the display unit 103 may also function as the input unit 102 like a touch panel, and the display unit 103 and the input unit 102 may have an integrated structure.

The trigger receiving unit 104 receives a trigger for starting the store mode and for ending the store mode, and outputs the triggers to the processing unit 105. The trigger receiving unit 104 includes at least one or more of a GPS communication unit for acquiring position information, a Bluetooth low energy (BLE) communication unit for acquiring a beacon signal, and a detection unit for detecting that the reading unit 101 has read a check-in code.

The processing unit 105 switches between the normal mode and the store mode for the application operating on the mobile terminal 100 on the basis of the output from the trigger receiving unit 104. The processing unit 105 performs a payment process or the like for the purchased product in the store mode.

The gate system 200 includes an information processing apparatus 210 and a gate apparatus 220. The information processing apparatus 210 and the gate apparatus 220 are communicatively connected via the network 10. A user leaves the store through the gate system 200.

The information processing apparatus 210 includes a first reading unit 211 and a display unit 212.

The first reading unit 211 is, for example, a camera (imaging unit), and images a two-dimensional code printed on a predetermined surface, such as a QR code generated after completion of a payment process that will be described later and displayed on the mobile terminal 100 or a QR code written on a product tag. The first reading unit 211 images the two-dimensional code and interprets the two-dimensional code according to a predetermined procedure to extract code information included in the two-dimensional code.

The display unit 212 is, for example, a liquid crystal display panel, a plasma display panel, or an organic EL display panel, and is controlled by a CPU included in the information processing apparatus 210. The display unit 212 displays a predetermined screen such as a collation result of a collation unit 222 that will be described later under the control of the CPU. Note that the display unit 212 may also function as an input unit such as a touch panel, for example.

The gate apparatus 220 includes a second reading unit 221 and the collation unit 222.

The second reading unit 221 includes an antenna, and reads identification information of a product from a radio frequency identifier (RFID) tag of the product. It is preferable that the second reading unit 221 includes a plurality of antennas because reading resolution and accuracy are improved.

The collation unit 222 collates the code information (information (payment information) including the identification information itself of the product for which the payment has been completed or information for referring to the identification information of the product for which the payment has been completed) acquired by the first reading unit 211 with the identification information of the product (identification information (carry-out information) of the product that the customer intends to carry out from the inside of the store to the outside of the store) acquired by second reading unit 221. Note that the collation unit 222 may be included in the information processing apparatus 210.

The store server 300 includes a store information database (DB) 301. The store information database 301 stores inventory information in the store, a floor map, and position information of a product in the store. Of course, each piece of information may be stored as a server for each store, or a server may be configured for each piece of inventory information, floor map, or product position information.

<Hardware Configuration of each Information Processing Apparatus>

Figure 2:
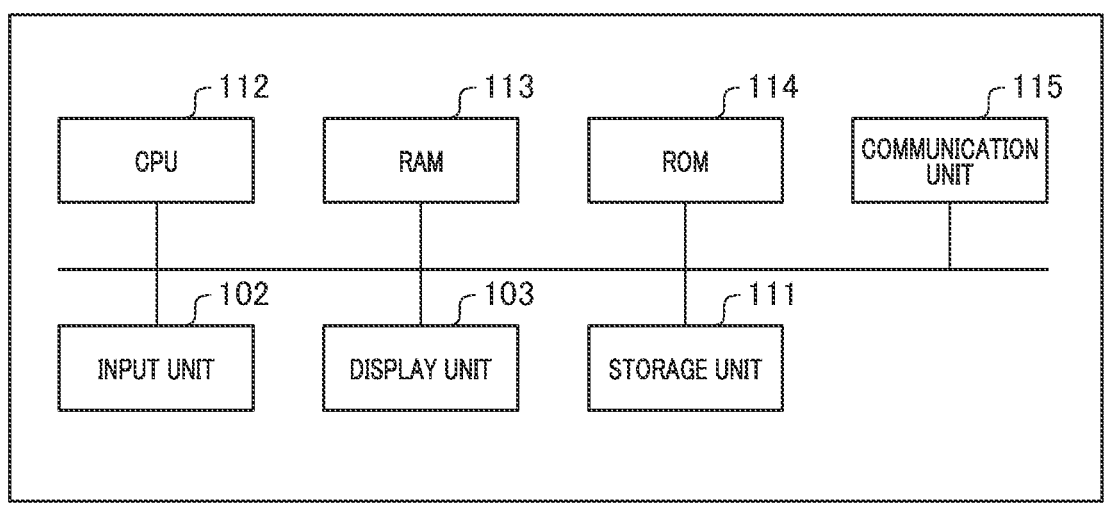
FIG. 2 is a block diagram illustrating a hardware configuration example of an information processing apparatus such as a mobile terminal.

FIG. 2 is a block diagram illustrating a hardware configuration of an information processing apparatus such as the mobile terminal 100. Here, the mobile terminal 100 will be described as an example. The mobile terminal 100 includes an input unit 102, a display unit 103, a storage unit 111, a CPU 112, a RAM 113, a ROM 114, and a communication unit 132.

The storage unit 111 stores a program that is executed by the CPU 112 to realize a flow in the mobile terminal 100 that will be described later, data used by the program, and the like.

The CPU 112 operates on the basis of a program or an application stored in the ROM 114 or the storage unit 111, and controls each unit of the mobile terminal 100. That is, the CPU 112 functions as a control unit of the mobile terminal 100. The ROM 114 stores a boot program executed by the CPU 112 when the mobile terminal 100 is started, a program depending on hardware of the mobile terminal 100, and the like. The CPU 112 loads the program of the ROM 114 to the RAM 113, and the CPU 112 executes the loaded program to realize a flow that will be described later. Note that the CPU 112 may acquire at least some of these programs from another device via the network 10 and execute the programs, or may directly execute the programs stored in the ROM 114.

The communication unit 115 receives data from another device via the network 10, sends the data to the CPU 112, and transmits data and an instruction generated by the CPU 112 to another device via the network 10. Note that each of the information processing apparatus 210, the gate apparatus 220, and the store server 300 has the same configuration as that in FIG. 2. However, the information processing apparatus 210 does not need to include two display units 103 and 212, and the gate apparatus 220 and the store server 300 may omit configurations corresponding to the display unit 103 and the input unit 102.

<Configuration of Gate Apparatus>

Figure 3:
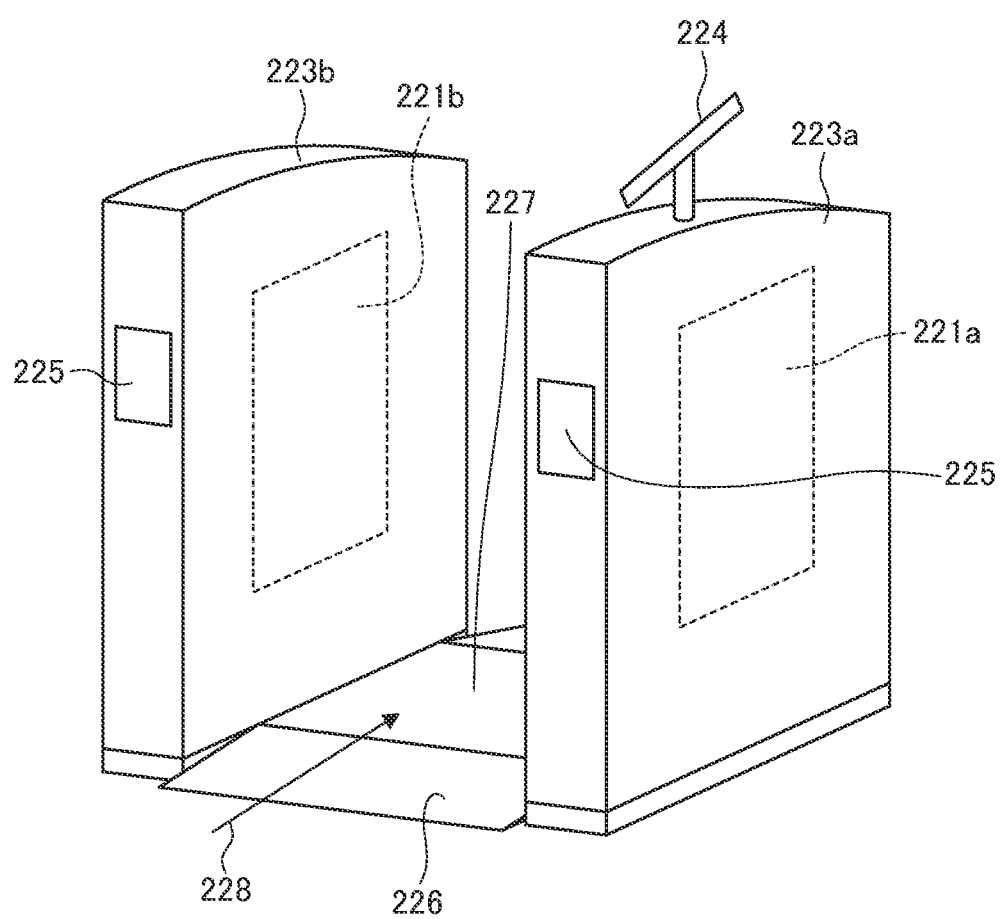
FIG. 3 is a schematic view illustrating an appearance of a gate apparatus.

FIG. 3 is a schematic view illustrating an appearance of the gate apparatus. A user enters the apparatus from the front of the apparatus illustrated in the drawing, proceeds in an advancing direction 228, operates the information processing apparatus 210 placed on a placement portion 224 to perform processing such as collation that will be described later, and if there is no problem with the processing, the user passes through the back of the apparatus illustrated in the drawing. A schematic structure of the gate apparatus 220 will be described with reference to this drawing. The gate apparatus 220 preferably has a color and a material feeling that do not give a sense of incongruity to the store and an appearance that ensures a sense of unity with the interior of the store. In addition to the second reading unit 221, the gate apparatus 220 includes a first side wall portion 223a, a second side wall portion 223b, a placement portion 224, a light emitting unit 225, and a metal member 226.

The first side wall portion 223a and the second side wall portion 223b are disposed to face each other to form a passage 227. The second reading unit 221 is disposed on at least one of the first side wall portion 223a and the second side wall portion 223b. Hereinafter, the first side wall portion 223a and the second side wall portion 223b will be simply collectively referred to as "side wall portions".

The second reading unit 221 reads identification information regarding a product by performing wireless communication with a tag attached to the product by using radio waves as a medium. That is, the second reading unit 221 acquires the identification information of the product stored in the tag by performing wireless communication with the tag attached to the product. The second reading unit 221 is, for example, an RFID reader including a plurality of antennas. The second reading unit 221 may include one antenna, but preferably includes a plurality of antennas. The second reading unit 221 emits (outputs) radio waves toward the passage 227 to form a reading region 230, and acquires the identification information of the product from the tag of the product carried by the user who has passed through the reading region 230 in the passage 227.

Figure 4:
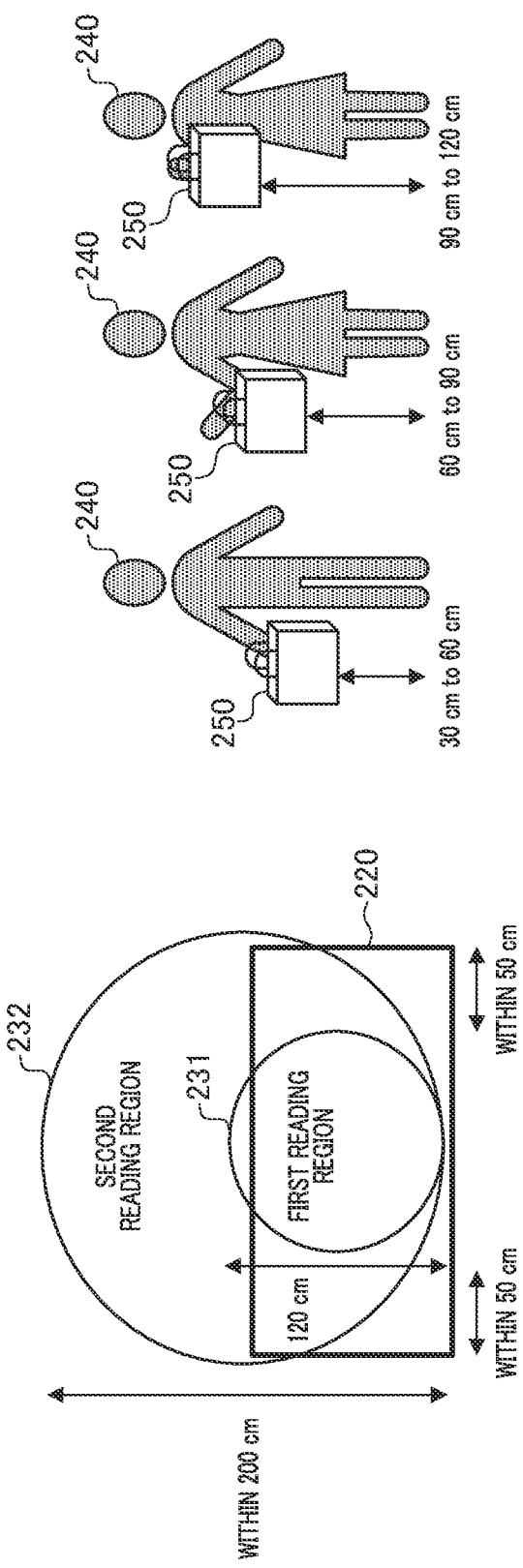
FIGS. 4A-4D are diagrams for describing a reading region of a second reading unit.

FIG. 4 is a diagram for describing the reading region 230 of the second reading unit 221. FIG. 4(A) is a schematic diagram illustrating an example of the reading region 230 of the second reading unit 221. The reading region 230 of the second reading unit 221 preferably includes a first reading region 231 in which reading accuracy of 90% or more is secured, and a second reading region 232 in which reading accuracy is lower than that of the first reading region 231. The second reading unit 221 is preferably disposed on the first side wall portion 223a or the second side wall portion 223b, or on both the first side wall portion 223a and the second side wall portion 223b such that a range within at least 50 cm from each of the entrance and exit ends of the side wall portion is set as the first reading region 231. The second reading unit 221 is disposed on the first side wall portion 223a or the second side wall portion 223b, or on both the first side wall portion 223a and the second side wall portion 223b such that a range of 90 cm or more in the height direction from a floor surface of the passage 227, more preferably, a range of 120 cm to 150 cm in the height direction from the floor surface of the passage 227 is set as the first reading region 231. The second reading unit 221 is preferably disposed on the first side wall portion 223a or the second side wall portion 223b, or on both the first side wall portion 223a and the second side wall portion 223b such that a range within 200 cm in the height direction from the floor surface of the passage 227 is set as the second reading region 232.

FIG. 4(B) is a schematic diagram illustrating a state in which a user 240 carries a bag 250 containing a product by the hand. In a case where the user 240 carries the bag 250 containing the purchased product by the hand and passes through the gate apparatus 220, it is considered that the bag 250 is located at a height of 30 cm to 60 cm from the floor surface of the passage 227. That is, in a case where the user 240 carries the bag 250 containing the purchased product by the hand and passes through the gate apparatus 220, the second reading unit 221 is disposed such that the range of the height of 30 cm to 60 cm from the floor surface of the passage 227 is set as the first reading region 231, whereby the second reading unit 221 can read the identification information of the product from the tag of the product in the bag 250 with high accuracy. FIG. 4(C) is a schematic diagram illustrating a state in which the user 240 hangs the bag 250 containing the product on the elbow. In a case where the user 240 hangs the bag 250 containing the purchased product on the elbow and passes through the gate apparatus 220, it is considered that the bag 250 is located at a height of 60 cm to 90 cm from the floor surface of the passage 227. That is, when the user 240 hangs the bag 250 containing the purchased product on the elbow and passes through the gate apparatus 220, the second reading unit 221 is disposed such that the range of the height of 60 cm to 90 cm from the floor surface of the passage 227 is set as the first reading region 231, whereby the second reading unit 221 can read the identification information of the product from the tag of the product in the bag 250 with high accuracy. FIG. 4(D) is a schematic diagram illustrating a state in which the user 240 holds the bag 250 containing the product in the chest. In a case where the user 240 holds the bag 250 containing the purchased product in the chest and passes through the gate apparatus 220, it is considered that the bag 250 is located at the height of 90 cm to 120 cm from the floor surface of the passage 227. That is, in a case where the user 240 holds the bag 250 containing the purchased product in the chest and passes through the gate apparatus 220, the second reading unit 221 is disposed such that the range of the height of 90 cm to 120 cm from the floor surface of the passage 227 is set as the first reading region 231, whereby the second reading unit 221 can read the identification information of the product from the tag of the product contained in the bag 250 with high accuracy.

Therefore, by disposing the second reading unit 221 such that the range of 90 cm or more in the height direction from the floor surface of the passage 227, more preferably, the range of 120 cm to 150 cm in the height direction from the floor surface of the passage 227 is set as the first reading region 231, the identification information of the product can be read with high accuracy even if the user 240 carries the bag 250 containing the product purchased in any state (posture). Although the bag 250 may be a shopping basket, it is preferable that a material thereof is not a conductor such as metal in order not to affect the reading accuracy of an RFID tag.

The tag attached to the product is, for example, a tag capable of recording identification information of the product, such as an RFID tag. For example, in a case where the tag corresponds to an RFID, an antenna and a chip (integrated circuit) that stores identification information are provided inside (embedded), and the tag is attached to a package or fixed to a part of a product with a member called ROX. When radio waves of the RFID reader in the UHF band are received from the outside by the antenna in the tag, electromotive force is generated, and information stored in the IC is output to the outside by similar radio waves in the UHF band. As a result, the second reading unit 221 can read the identification information of the product.

In order to reduce reading omission of the RFID tag of the product by the second reading unit 221, it is preferable to dispose the second reading unit 221 on both the first side wall portion 223a and the second side wall portion 223b. In the first side wall portion 223a and the second side wall portion 223b, a conductor such as a thin metal plate or a thin metal film is disposed in a direction of a surface not facing the passage 227 (a direction from the center of the apparatus to the outside of the apparatus across the side wall portion) so that radio waves used for reading by the second reading unit 221 do not leak.

The information processing apparatus 210 is placed on the placement portion 224. The placement portion 224 is disposed at a position where the display unit 212 of the information processing apparatus overlaps at least a part of the first reading region 231 of the second reading unit 221 of the gate apparatus 220 in the direction along the passage 227 (advancing direction 228). It is conceivable that the user decelerates or stops near the display unit 212 in order to check a collation result that will be described later when passing through the gate apparatus 220. Therefore, with such a configuration, the second reading unit 221 can efficiently read an RFID tag and the like, and a user can efficiently pass through the gate apparatus 220. It is more preferable that the reading region of the first reading unit 211 is disposed at a position overlapping at least a part of the first reading region 231 of the second reading unit 221 of the gate apparatus 220 in the advancing direction 228. In other words, it is more preferable that the first reading unit 211 is disposed in the vicinity of the display unit 212. In such a configuration, a user can more efficiently pass through the gate apparatus 220.

The light emitting unit 225 is disposed on one of the entrance side and the exit side of the side wall portion, and includes, for example, an LED. A light emission color of the light emitting unit 225 changes according to a state of the gate apparatus 220, a collation result that will be described later, and the like. Specifically, for example, in an available state, the light emitting unit 225 may be lit in green, and in an unavailable state (for example, a fault condition) or in a case where a collation result that will be described later is an error, the light emitting unit 225 may be lit in red. Note that variations of light emission are not limited thereto.

The metal member 226 is disposed on the floor surface between the first side wall portion 223a and the second side wall portion 223b near the entrance and the exit of the gate apparatus 220, in other words, on the floor surface of the passage 227. The metal member 226 reduces steps between various wirings (including power lines and Ethernet cables) connecting between the first side wall portion 223a and the second side wall portion 223b, and allows a wheelchair or the like to easily pass through the passage.

<Processing of Purchase Support System>

Figure 5:
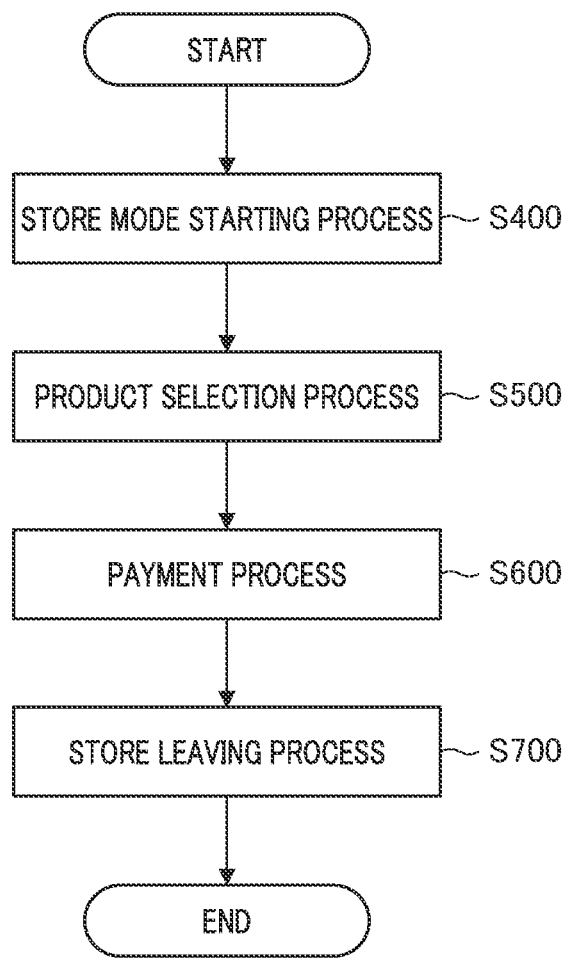
FIG. 5 is a flowchart illustrating a flow of entire processing of the purchase support system.

FIG. 5 is a flowchart illustrating a flow of the entire processing of the purchase support system 1. Here, a flow of the entire processing of the purchase support system 1 will be described, and details of each process will be described later. In S400, the mobile terminal 100 performs a store mode starting process. In S500, the mobile terminal 100 performs a product selection process and receives product selection from a user. In S600, the mobile terminal 100 performs a payment process on the basis of an instruction from the user. In S700, the gate system 200 performs a store leaving process.

<Store Mode Starting Process>

Figure 6:
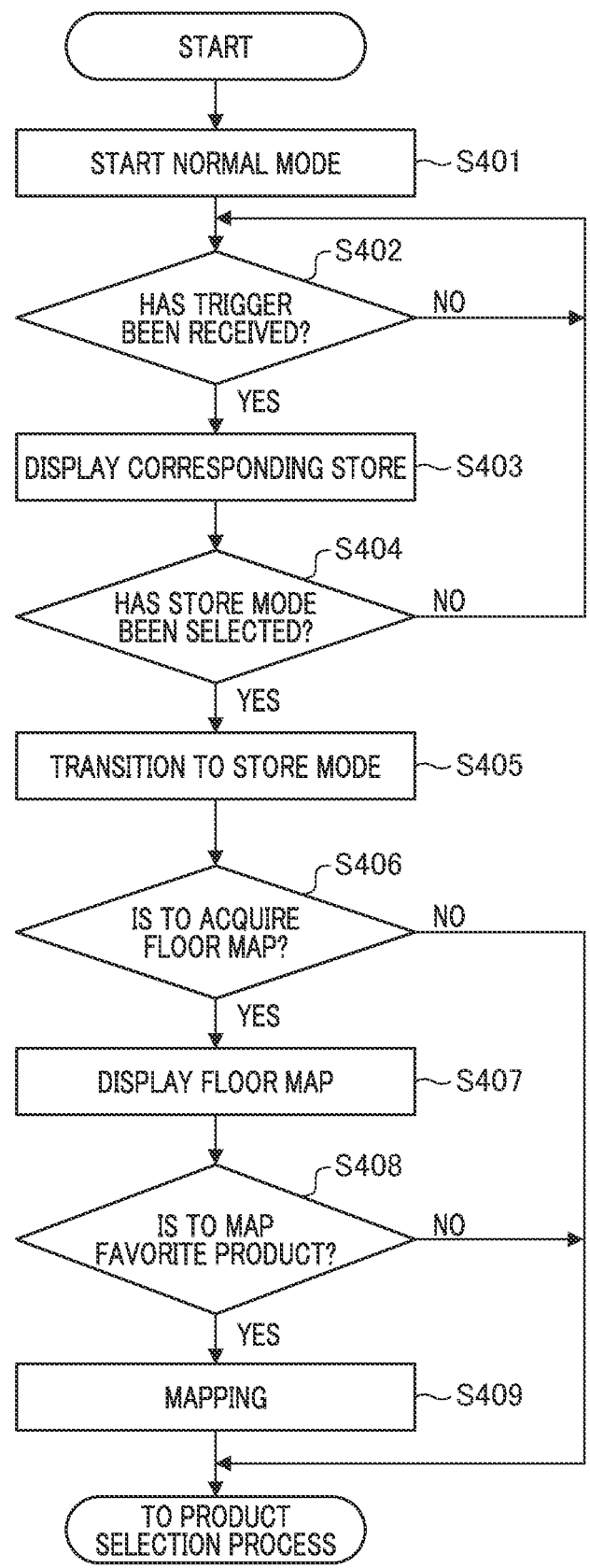
FIG. 6 is a flowchart illustrating a store mode starting process.

FIG. 6 is a flowchart illustrating the store mode starting process. Each operation (step) illustrated in this flowchart is executed by the CPU 112 included in the mobile terminal 100 controlling each unit of the mobile terminal 100.

When the mobile terminal 100 receives an application start instruction from the user in S401, an application (hereinafter, simply expressed as an application) related to purchase support of the mobile terminal 100 is started in the normal mode. Next, in S402, the trigger receiving unit 104 determines whether a trigger (start trigger) for starting the store mode has been received. Here, the start trigger is, for example, a beacon signal emitted from a device installed in the store, a short-range wireless communication signal such as Bluetooth (trademark), and position information in the store. In the case of a signal, a store ID may be directly embedded in the signal. In a case where the position information is used, a table in which a store ID and reference position information are associated with each other is stored in advance in an external server, the trigger receiving unit 104 acquires a store ID close to the position information acquired from a GPS and reference position information, and in a case where a difference between the reference position information and the position information of the GPS is within a threshold value, the position information is determined as position information in the store. The fact that the reading unit 101 reads a code including the store ID and acquires the store ID may be used as a trigger, or the plurality of pieces of information described above may be used in combination as a trigger.

In a case where the start trigger has been received (S402, Yes), in S403, the processing unit 105 displays a screen (store mode selection screen) for selecting (enabling) a store mode of the store (corresponding store) corresponding to the received trigger on the display unit 103. Here, in a case where the store mode is not selected (S404, No), the processing returns to S402. On the other hand, in a case where the store mode is selected (S404, Yes), the processing unit 105 causes the application to transition to the store mode in S405, and stores the current time as the store entry time in association with the store ID acquired by the reading unit 101 as check-in information. Note that in a case where the start trigger has been received, the processing unit 105 may automatically transition to the store mode.

When the mode transitions to the store mode, the processing unit 105 determines whether to acquire a floor map of the corresponding store in S406. Here, for example, in a case where the user selects acquisition of the floor map by using the input unit 102 (S406, Yes), the processing unit 105 acquires the floor map of the corresponding store from the store server 300 in S407, and displays the acquired floor map on the display unit 103. On the other hand, in a case where it is not selected to acquire the floor map (S406, No), the processing proceeds to the product selection process (S500).

In S407, the processing unit 105 determines whether to display a list of products that the user is considering to purchase, that is, a position of a product (favorite product) registered in a favorite list in the store on the acquired floor map, that is, whether to perform mapping. The user may register a selected product in the favorite list in the normal mode. Of course, the product may be registered in the favorite list even in the store mode. Here, for example, in a case where the user has selected mapping by using the input unit 102 (S408, Yes), the processing unit 105 maps a position of the favorite product onto the floor map in S409, and causes the processing to proceed to the product selection process (S500). Note that, here, a product put in a cart in the normal mode may be mapped onto the floor map together with the favorite product or instead of the favorite product. The user may select a product to be displayed on the floor map from, for example, keyword search, a product category, or a product lineup, and map a position of the selected product. On the other hand, in a case where mapping has not been selected (S408, No), the processing proceeds to the product selection process (S500). Note that S406 to S409 may be processed in parallel only when a function related to the floor map is called.

Note that, even after the transition to the store mode, the normal mode may be made available by the user's selection. For example, the store mode and the normal mode can be executed in parallel. With such a configuration, the user can purchase some or all of products via the Internet after checking actual products in a real store. A form of transitioning to the normal mode by exiting the store mode will be described below.

Figure 7A:
FIGS. 7A-7B are diagrams illustrating an example of a display screen at the time of starting a store mode.

FIG. 7 is a diagram illustrating an example of a display screen at the time of starting the store mode. FIG. 7(A) is a diagram illustrating an example of a store mode selection screen 420 displayed in S403. On the store mode selection screen 420, the store mode of the store corresponding to the store ID of the received start trigger can be selected. A store name 421 corresponding to the store ID and an icon 422 for selecting the store mode are displayed on the store mode selection screen 420.

Figure 7B:
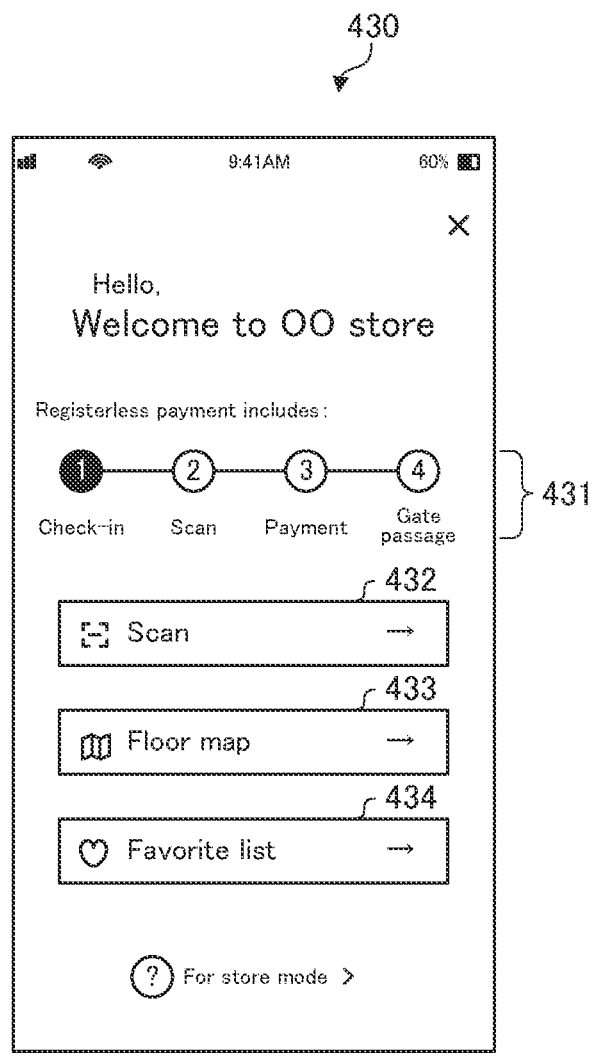

FIG. 7(B) is a diagram illustrating an example of a screen in the store mode displayed in S405. When the store mode is started, a menu screen 430 in the store mode is displayed. On the menu screen 430, step display 431 is provided so that the user can easily ascertain the processing in the store mode. Note that "check-in" in the step display 431 as an example corresponds to the store mode starting process (S400), "scan" corresponds to the product selection process (S500), "payment" corresponds to the payment process (S600), and "gate passage" corresponds to the store leaving process (S700).

The menu screen 430 includes, for example, a scan icon 432, a floor map icon 433, and a favorite list icon 434. When the user selects the scan icon 432 through tapping or the like, the product selection process that will be described later can be executed. When the user selects the floor map icon 433, the floor map acquisition in S407 is executed. When the user selects the favorite list icon 434, the content of the favorite list can be checked on the display screen. In a case where the favorite list icon 434 is selected after the floor map is acquired, mapping of the favorite product in S409 can be executed.

Figure 8:
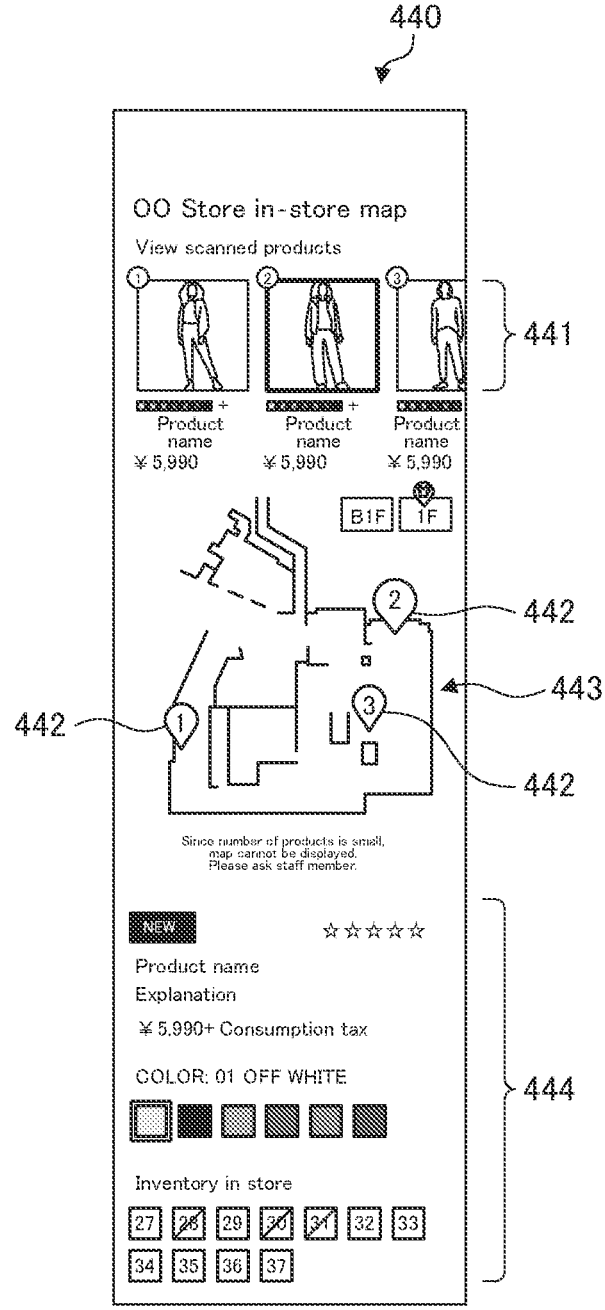
FIG. 8 is a diagram illustrating an example of screen display including a mapped floor map.

FIG. 8 is a diagram illustrating an example of a display screen including a mapped floor map. A display screen 440 includes, for example, a thumbnail image 441 corresponding to a favorite product and a floor map 443 on which an icon 442 indicating position information of each of favorite products is identifiably displayed. Detailed information including a price of a selected favorite product, a developed size and color of the product, and the like, and inventory information (information 444) in the store may be displayable.

Figure 9:
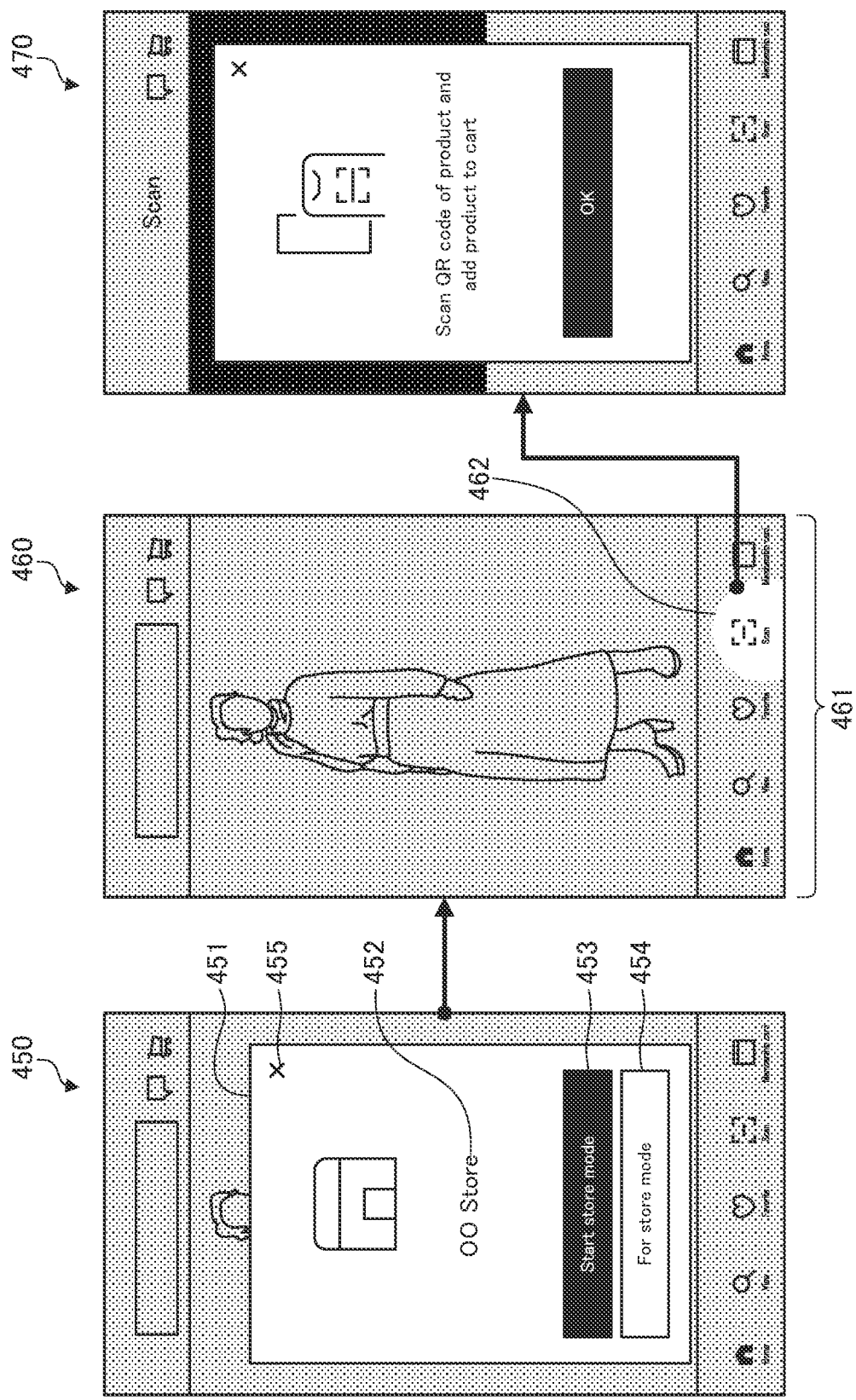
FIG. 9 is a diagram illustrating another example of a display screen at the time of starting the store mode.

FIG. 9 is a diagram illustrating another example of the display screen at the time of starting the store mode. In the example in the drawing, when the start trigger is received, a display screen 450 is first displayed. Store mode selection display 451 is performed on the display screen 450. The store mode selection display 451 includes a store name 452 corresponding to the store ID and an icon 453 for selecting the store mode. An icon 454 for the user to check details of the store mode is further displayed on the store mode selection display 451. In a case of selecting the icon 454, the user can check details of processing in the store mode and an operation method. In a case where the user selects the icon 453 for selecting the store mode, the store mode is started and a display screen 460 is displayed. On the display screen 460, operation icons 461 for the user to operate the application in the store mode are displayed. For example, in a case where the user selects a scan icon 462 among the operation icons 461, the screen transitions to the display screen 470, and the product selection process that will be described later can be executed. Note that, in a case where the user selects a store mode end icon 455 through tapping or the like on the display screen 450, it is possible to end the store mode and transition to the normal mode.

Figure 10:
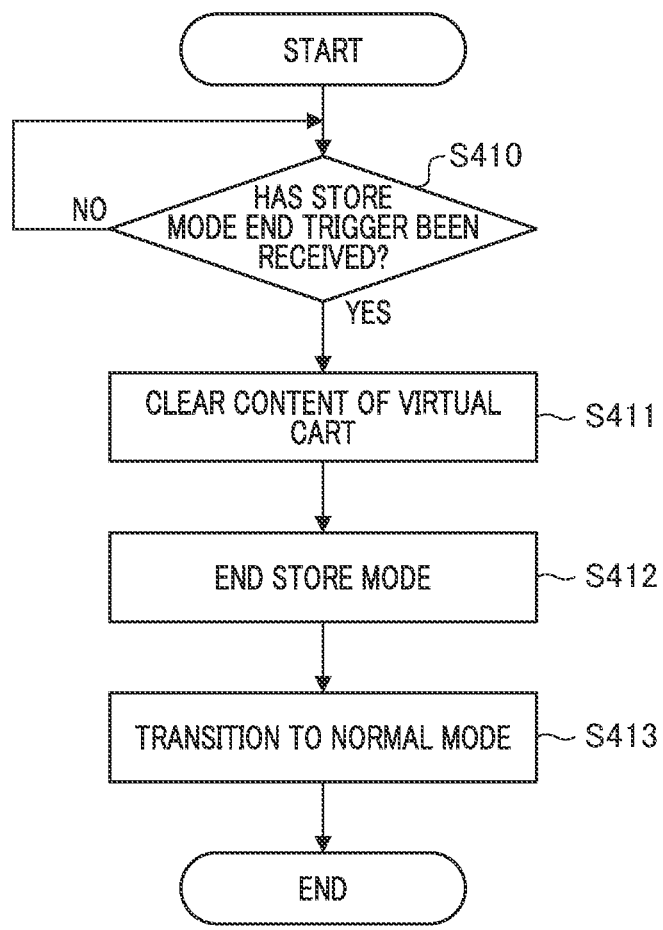
FIG. 10 is a flowchart illustrating a store mode ending process.

In a case where the trigger receiving unit 104 has received a trigger (end trigger) for ending the store mode after starting the store mode, the processing unit 105 ends the store mode and transitions to the normal mode. FIG. 10 is a flowchart illustrating a store mode ending process. Each operation (step) illustrated in this flowchart is executed by the CPU 112 included in the mobile terminal 100 controlling each unit of the mobile terminal 100. In S410, the trigger receiving unit 104 determines whether an end trigger has been received. Here, the end trigger is, for example, that a predetermined time has elapsed from the store entry time included in check-in information, that position information regarding a position separated by a predetermined distance from the reference position information of the store being checked in, that is, the corresponding store has been acquired, or that the user has given an instruction for ending the store mode. In a case where the end trigger has been received (S410, Yes), in S411, the processing unit 105 performs a check-out process such as clearing (deleting) the content of the virtual cart in the store mode and deleting the stored check-in information, and in S412, the store mode is ended and the mode proceeds to the normal mode (transition).

Figure 11A:
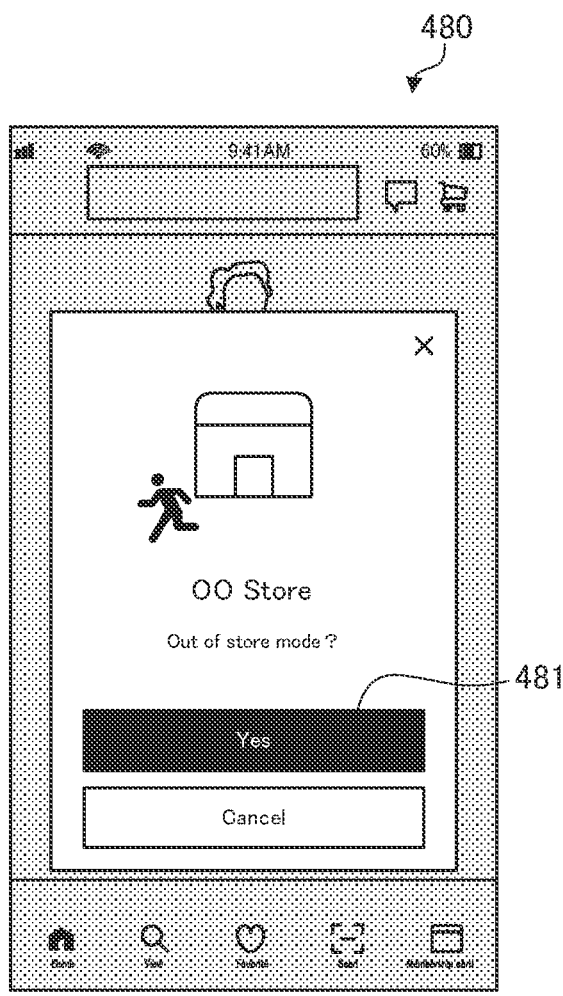
FIGS. 11A-11B are views illustrating an example of a display screen at the time of ending the store mode.
Figure 11B:
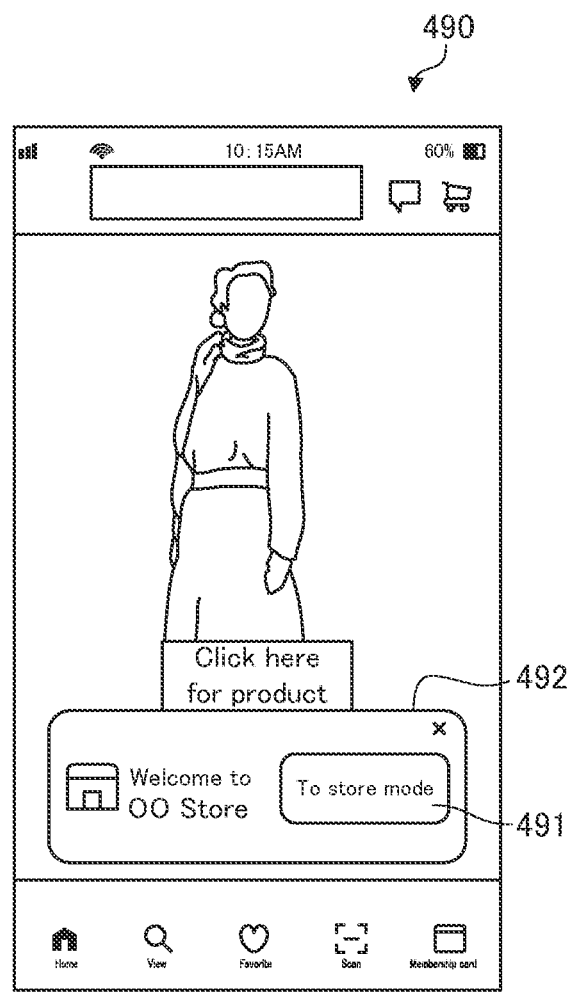

FIG. 11 is a diagram illustrating an example of a display screen at the time of ending the store mode. FIG. 11(A) is a diagram illustrating an example of a store mode end selection screen. A store mode end selection screen 480 includes an icon 481 for ending the store mode. In a case where the user selects the icon 481 for ending the store mode, the store mode is ended and transitions to the normal mode. Note that, even after the transition to the normal mode, for example, when the trigger receiving unit 104 detects that the user is in the store, it is preferable to perform store mode selection display 492 including an icon 491 for selecting the store mode on the screen display 490 in the normal mode as illustrated in FIG. 11(B). With such screen display, the user can easily return to the store mode. Note that FIG. 11(B) is a diagram illustrating an example of screen display in the normal mode after the store mode is ended.

<Product Selection Process>

Figure 12:
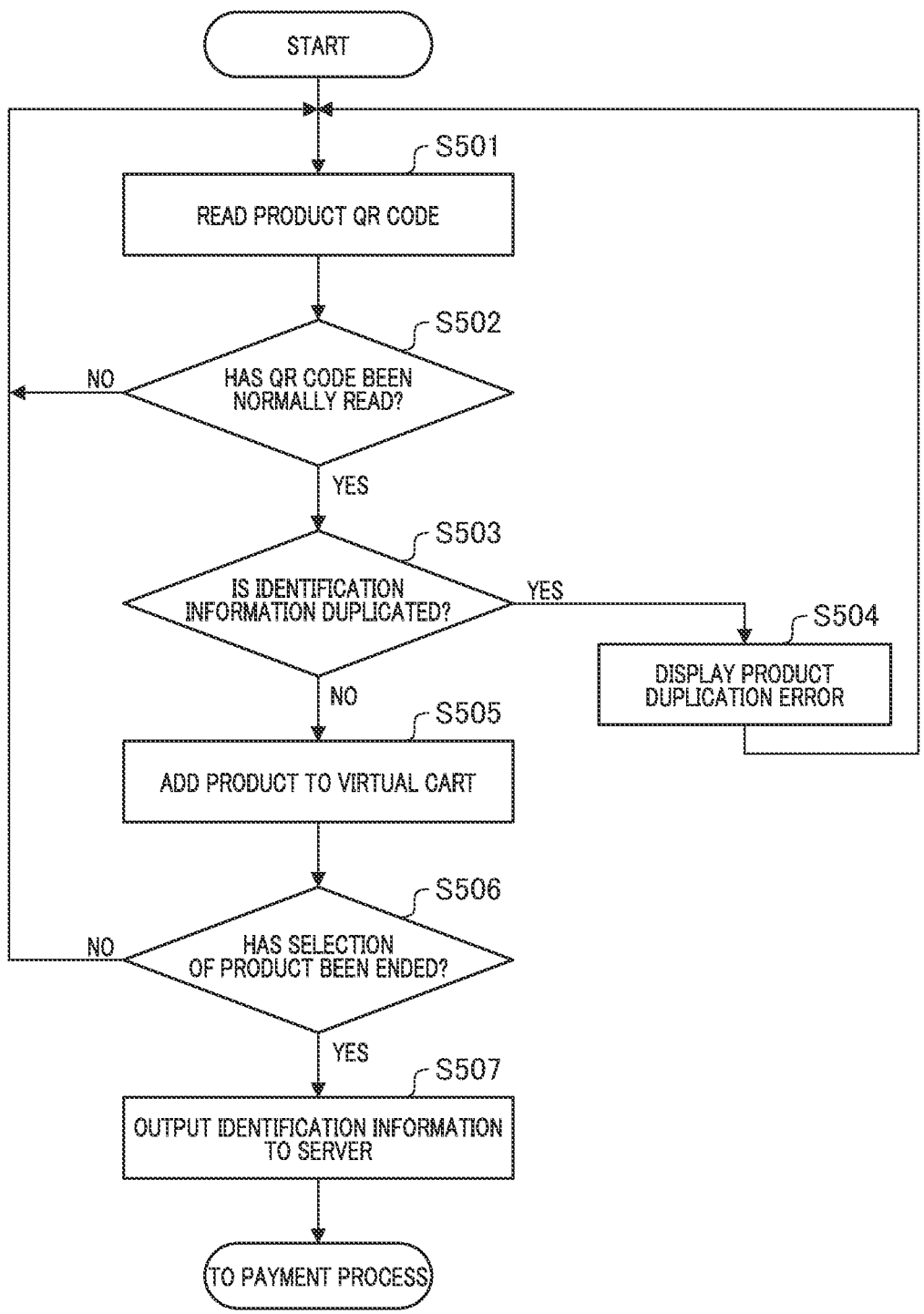
FIG. 12 is a flowchart illustrating a product selection process.

FIG. 12 is a flowchart of a product selection process. Each operation (step) illustrated in this flowchart can be executed by the CPU 112 included in the mobile terminal 100 controlling each unit of the mobile terminal 100.

In S501, the user uses the reading unit 101 to read a two-dimensional code such as a QR code written on a tag attached to a product. In S502, the reading unit 101 determines whether the reading has been normally performed, for example, whether the number of digits of the read content matches or whether the read content falls within a range that can be restored by an error correction code. In a case where the two-dimensional code has not been normally read (S502, No), the two-dimensional code is read again (S501). In a case where the two-dimensional code has been normally read (S502, Yes), the processing unit 105 checks whether or not identification information is duplicated between products already added to a virtual cart. Here, the identification information is a number uniquely assigned to each individual product, and the identification information is different in a case of different individuals even if the products are of the same type. For example, a hexadecimal number of 24 digits may be used as the identification information, which is the same as content stored in an RFID chip embedded in a tag attached to a product as an electric product code (EPC). The identification information may also be referred to as an individual identification number. In a case where the identification information read by the reading unit 101 is duplicated (S503, No), the processing unit 105 displays an error on the display screen of the display unit 103 in S504. This is to prevent payment for the same individual twice. Note that, for example, other error notifications may be used as long as the user can recognize the error, such as generating an error sound. On the other hand, in a case where the identification information is not duplicated (S503, Yes), the processing unit 105 adds the product to the virtual cart in S505.

In S506, the processing unit 105 checks whether the selection of the product has been ended. In a case where the selection of the product has not been ended (S506, No), S501 to S505 are repeatedly performed until the selection of the product is ended. On the other hand, in a case where the selection of the product has been ended (S506, Yes), in S507, the processing unit 105 outputs the identification information of all the products added to the virtual cart to the store server 300. The store server 300 records the fact that the product is added to the virtual cart in the identification information of the product received from the mobile terminal 100. In this case, the store server 300 may output, for example, a total amount of products added to the virtual cart to the mobile terminal 100. The processing proceeds to the payment process.

FIG. 13 is a diagram illustrating an example of a display screen at the time of selecting a product. FIG. 13(A) is a diagram illustrating an example of a scan screen (reading screen). A scan screen 510 includes a scan region (reading region) 511. A two-dimensional code such as a QR code written on the tag of a product is located in the scan region 511, and the user images the two-dimensional code by using the reading unit 101. As a result, identification information of the product is read, and the product can be selected, in other words, the product can be added to the virtual cart. FIG. 13(B) is a diagram illustrating an example of a scan completion screen. In a case where reading is normally performed in S502, a scan completion screen 520 is displayed. On the scan completion screen 520, a scan result 521 is displayed so that the user can visually recognize that the scan has been normally completed and the product has been added to the virtual cart. A virtual cart icon 522 is displayed on the display screen at the time of selecting a product. The user can check the product in the virtual cart by selecting the virtual cart icon 522 through tapping or the like. FIG. 13(C) is a diagram illustrating an example of a screen for checking a product in the virtual cart. On a screen 530 for checking a product in the virtual cart, detailed information 531 such as a product name, color, size, price, thumbnail image, and the like of the product in the virtual cart is displayed. In a case where the user selects a deletion icon 532, the selected product can be deleted from the virtual cart. On the screen 530, a total amount 533 of the products in the virtual cart is displayed. A payment icon 534 is displayed on the screen 530. In a case where the user selects a payment icon 534, a payment process that will be described later can be executed.

Figure 14:
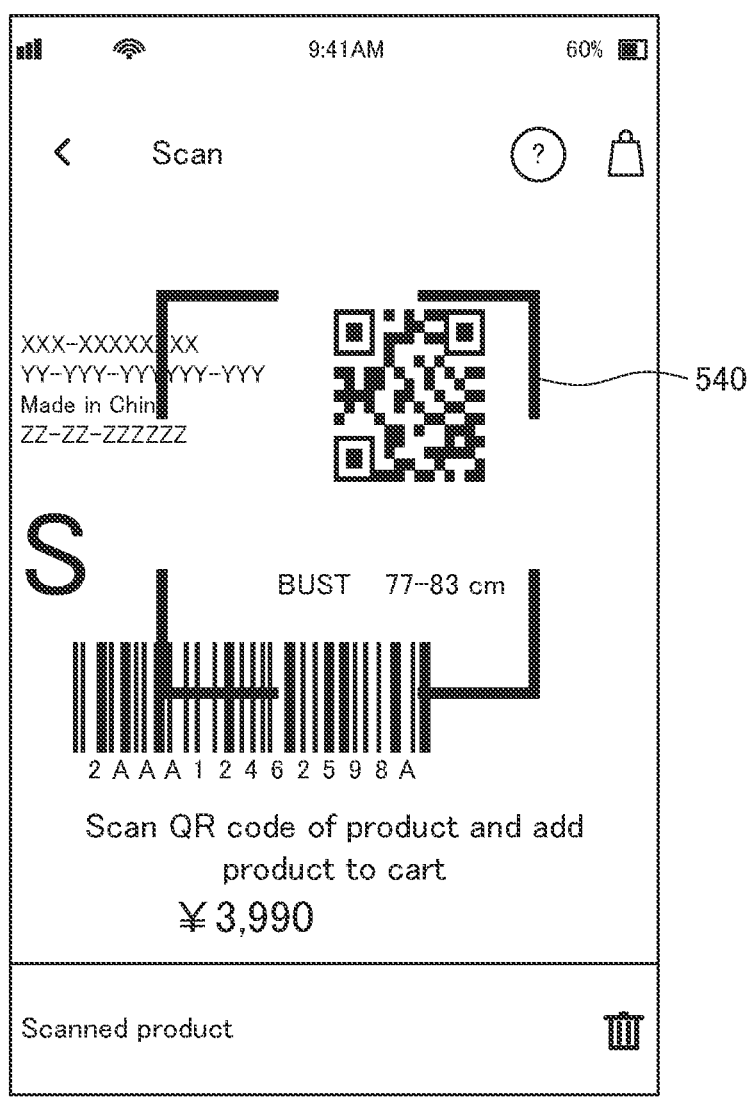
FIG. 14 is a diagram illustrating another example of a scan screen.

FIG. 14 is a diagram illustrating another example of the scan screen. For example, a scan frame (reading frame) 540 may be displayed on the scan screen. In a case where the scan frame 540 is displayed, the scan frame 540 can be used as an index related to a position where the two-dimensional code is to be located, and the user can more easily image the two-dimensional code. In the scan screen in the store mode, for example, it is preferable to display the scan frame 540 in different aspects, such as in a color arrangement different from that in the normal mode, or changing a shape of the scan frame 540, in other words, performing different screen display. With such a configuration, a user can intuitively recognize whether the user is performing scanning in the normal mode or the store mode.

Note that the product selection process may also be executed in the normal mode. In the case of the normal mode, type information such as a price look-up (PLU) code provided for each type of product may be acquired by reading a two-dimensional code such as a barcode instead of a two-dimensional code including individual identification number information uniquely provided for each individual product such as a QR code. The type information includes one or more pieces of information for distinguishing the type of the product, such as a product number, a color, a size, and a price of the product. That is, the same type information is assigned to products of the same type (for example, products of the same product number, color, and size). In the normal mode, since the product can be purchased through the Internet, it is sufficient that the type information of the product can be acquired. Since the normal mode and the store mode can be executed in parallel, for example, a scan frame for reading a QR code for the store mode and a scan frame for reading a barcode for the normal mode may be displayed on one scan screen. In this case, it is preferable to dispose the scan frame for the QR code and the scan frame for the barcode on the screen in accordance with disposition of the QR code and the barcode in the tag attached to the product. In the normal mode, for example, a product may be selectable from keyword search, a product category, or a product lineup.

<Payment Process>

Figure 15:
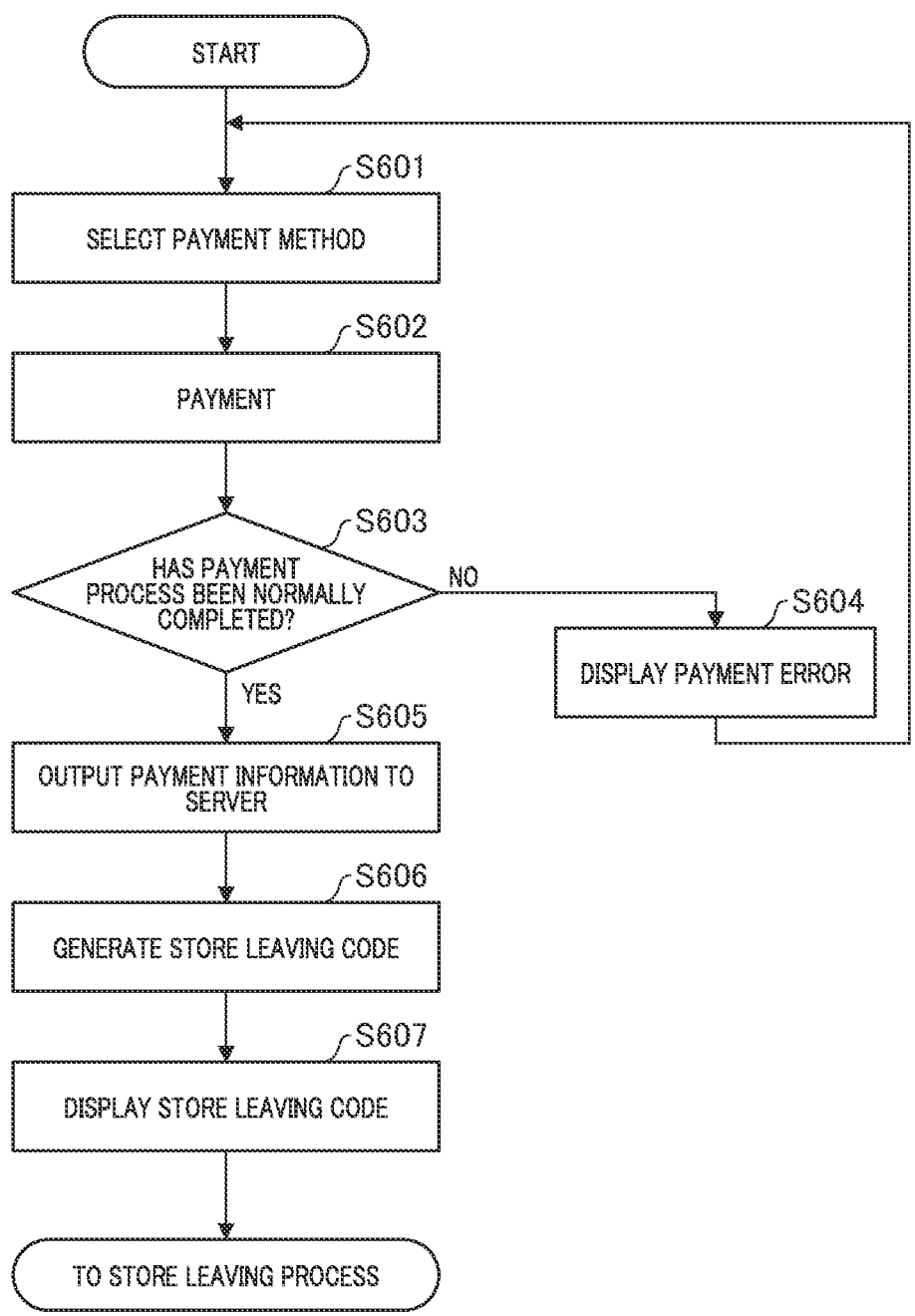
FIG. 15 is a flowchart illustrating a payment process.

FIG. 15 is a flowchart illustrating a payment process. Each operation (step) illustrated in this flowchart is executed by the CPU 112 included in the mobile terminal 100 controlling each unit of the mobile terminal 100.

In S601, the user selects a payment method via the input unit 102, for example. As a payment method, for example, payment using a predetermined application called credit payment, electronic money payment, immediate deduction payment, point payment, and smartphone payment may be selected. The smartphone payment may be incorporated in the mobile terminal 100 as one function of an application related to purchase support. In S602, the processing unit 105 performs payment according to the selected method. Specifically, the processing unit 105 transmits information necessary for payment to an external payment server (not illustrated) corresponding to the selected method, and requests a payment process. In S603, the processing unit 105 determines whether the payment has been normally completed on the basis of a response from the payment server. Here, in a case where the payment has not been normally completed (S603, No), the processing unit 105 displays a payment error on the display screen of the display unit 103. Note that, for example, other error notification may be used as long as the user can recognize a payment error, such as generating an error sound. S601 to S603 are repeatedly performed until the payment is normally completed. On the other hand, in a case where the payment has been normally completed (S603, Yes), the processing unit 105 outputs the identification information of the product for which the payment has been completed to the store server 300 in S605. The store server 300 records that the payment has been completed and the product has been sold for the identification information of the product received from the mobile terminal 100. The processing unit 105 generates a two-dimensional code (store leaving code) such as a store leaving QR code associated with the payment information including the identification information of all the products paid in S606, the payment completion time, and the like, and displays the store leaving code on the display unit 103 in S607. Note that the store leaving code may be transmitted to the mobile terminal 100 by e-mail or the like. The payment information may be directly embedded in the store leaving QR code, or the store server may store the payment information, and the payment information stored in the store server may be accessed from a link embedded in the store leaving QR code. Since the payment process for the product can be performed by the mobile terminal owned by a customer who is the user, the user does not need to line up in an accounting machine in the store, and the time required for accounting can be shortened.

Figure 16:
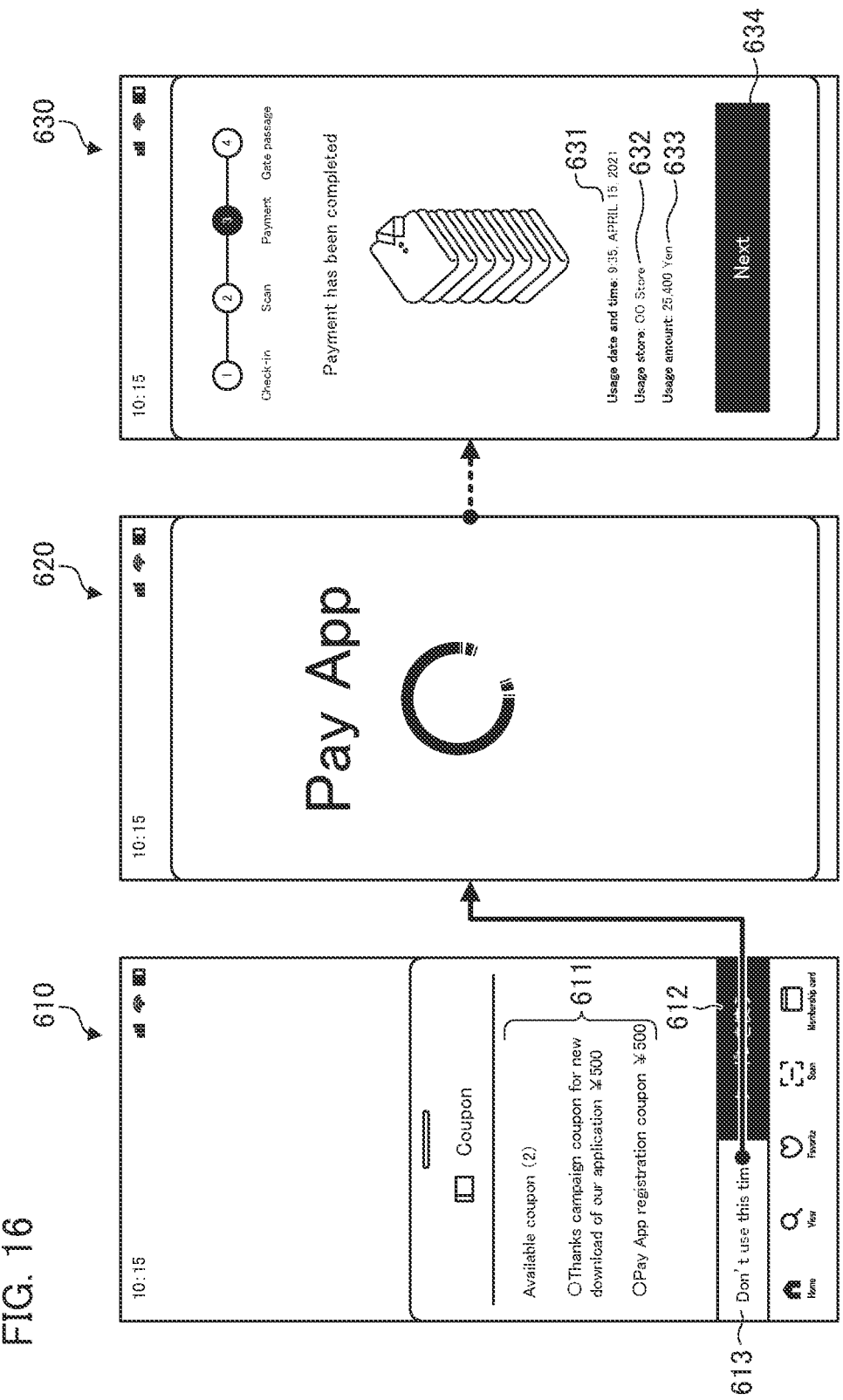
FIG. 16 is a diagram illustrating an example of a display screen at the time of payment.

FIG. 16 is a diagram illustrating an example of a display screen at the time of payment. A display screen 610 is displayed, for example, by selecting a payment icon 534 illustrated in FIG. 13(C). The display screen 610 is a display screen when the payment process is executed, and available coupon information 611 may be displayed on the display screen 610. The user can use a coupon to perform payment by selecting the coupon to use and selecting an icon 612 for performing the payment by using the coupon. On the other hand, in a case where a coupon is not used, payment can be performed without using the coupon by selecting an icon 613 for performing payment without using the coupon. In a case where the user selects the icon 612 or the icon 613, the payment screen 620 is displayed and payment (S602) is performed. When the payment has been normally completed, a payment completion screen 630 is displayed, and the user can confirm that the payment has been normally completed. On the payment completion screen 630, for example, a date and time (usage date and time) 631 on which the payment was completed, a name 632 of the store (use store) where the product was purchased, and a total amount (usage amount) 633 of purchased products are displayed. In a case where the user selects the icon 634 for proceeding to the next process, the screen transitions to a screen in FIG. 17.

Figure 17:
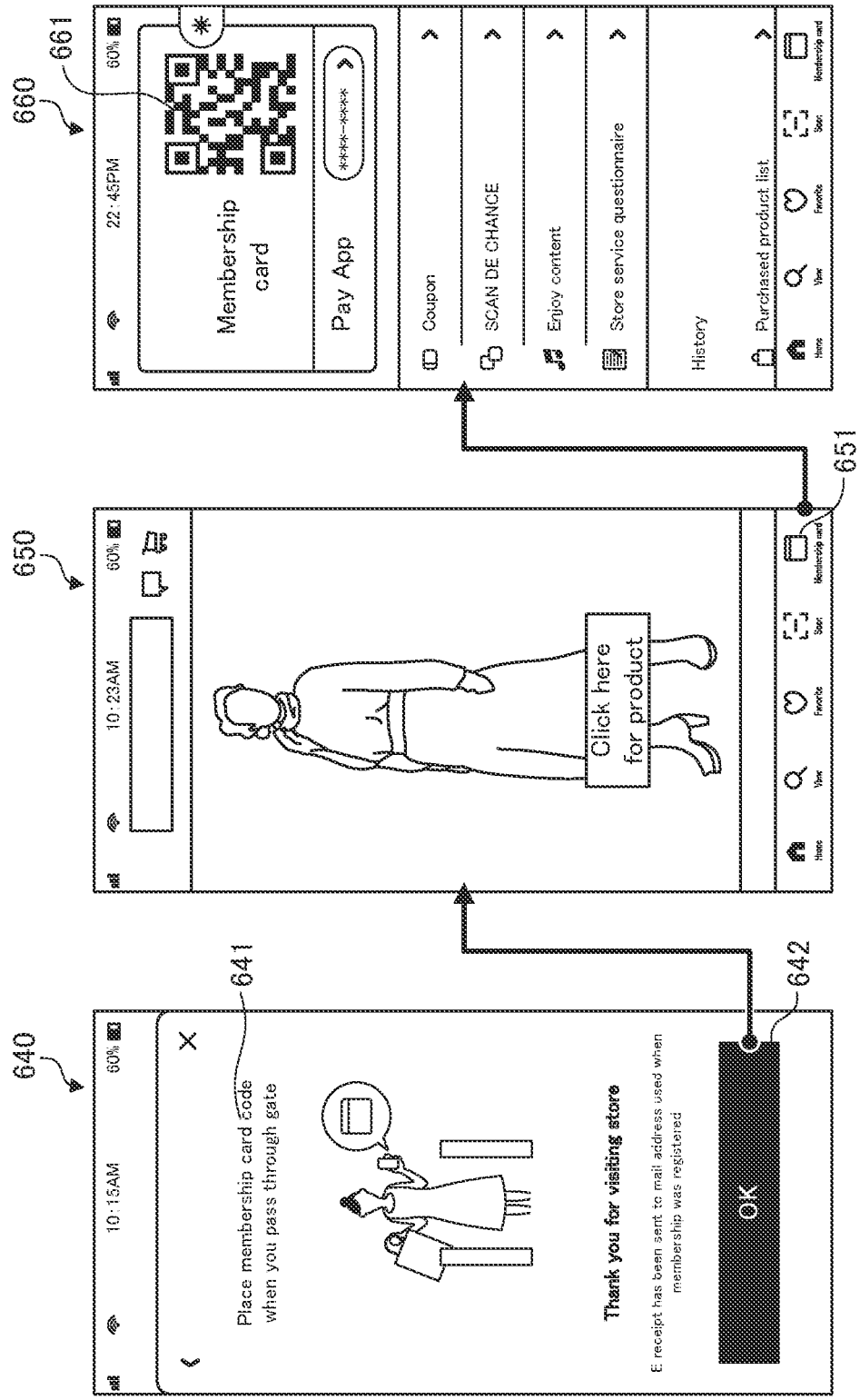
FIG. 17 is a diagram illustrating an example of a display screen at the time of payment completion.

FIG. 17 is a diagram illustrating an example of a display screen at the time of payment completion. On the display screen 640, a guide 641 (explanation) for a store leaving process is displayed. The user can leave the store by passing through the gate apparatus 220 according to the guide 641. Here, as an example, an example in which a membership card in which a member ID is embedded is used as a store leaving code will be described. When the user selects the icon 642 that approves checking of the guide 641, the screen transitions to a menu screen 650. In a case where the user selects a membership card icon 651 on the menu screen 650, a membership card screen 660 is displayed. On the membership card screen 660, a two-dimensional code 661 such as a QR code including membership information is displayed. The two-dimensional code 661 is a two-dimensional code as a membership card in which the member ID is embedded by associating the payment information with the member ID in an external member ID server (not illustrated). Such a two-dimensional code may be used as the store leaving code.

Figures 18A, 18B, 18C:
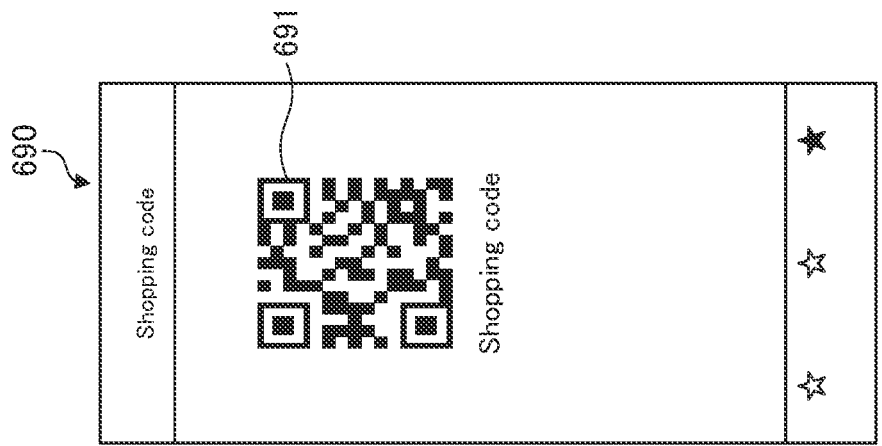
FIGS. 18A-18C are diagrams illustrating another example of a display screen at the time of payment completion.

FIG. 18 is a diagram illustrating another example of the display screen at the time of payment completion. In the example in FIG. 18, a store leaving code is displayed after completion of payment. FIG. 18(A) is a diagram illustrating an example of a payment procedure (purchase procedure) screen 670. FIG. 18(A) illustrates an example in which credit card payment is selected as a payment method. On the payment procedure screen 670, for example, a name 671 of the store where the product is purchased (shopping store), a selected payment method (payment method) 672, a total number of purchased products 673, and a total amount of the purchased products 674 are displayed. In a case where the user selects a confirmation icon 675 on the payment procedure screen 670, payment (S602) is performed. FIG. 18(B) is a diagram illustrating an example of a payment completion screen 680. The payment completion screen 680 is a screen indicating that the payment has been normally completed, and is displayed such that the user can intuitively recognize that the payment has been normally completed. FIG. 18(C) is a diagram illustrating an example of a store leaving code display screen 690. When the payment has been normally completed, the store leaving code display screen 690 is displayed. The store leaving code display screen 690 includes a store leaving code 691. The user uses the store leaving code 691 to perform a store leaving process that will be described later.

<Store Leaving Process>

Figure 19:
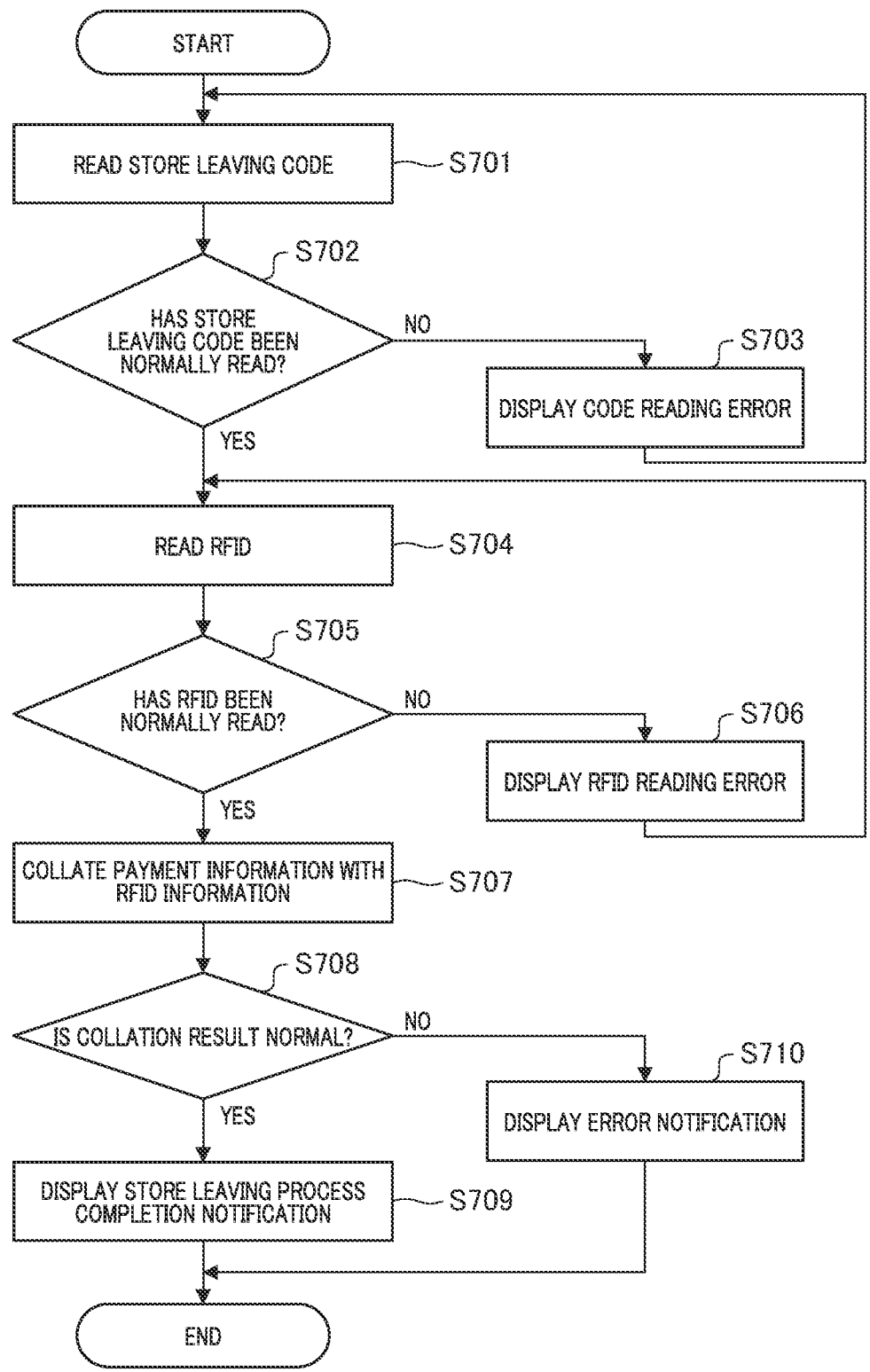
FIG. 19 is a flowchart illustrating a store leaving process.

FIG. 19 is a flowchart illustrating a store leaving process. Each operation (step) illustrated in this flowchart is executed by the CPU included in the gate apparatus 220 or the information processing apparatus 210 controlling each unit.

In S701, the user causes the display unit 103 of the mobile terminal 100 to display the store leaving code, and causes the first reading unit 211 of the information processing apparatus 210 to read the store leaving code. The first reading unit 211 reads the store leaving code. In S702, the first reading unit 211 determines whether reading has been normally performed. In a case where the reading has not been normally performed (S702, No), the display unit 212 displays a code reading error on the display screen in S703. Note that, for example, other error notifications may be used as long as the user can recognize an error, such as generation of an error sound, or transition to the next state may be omitted. The store leaving code is repeatedly read (S701) until the store leaving code is normally read.

On the other hand, in a case where the store leaving code has been normally read (S702, Yes), the second reading unit 221 of the gate apparatus 220 reads the identification information of the product from the RFID tag of the product in S704. Specifically, in a case where the user enters the passage 227 of the gate apparatus 220 with the purchased product, the second reading unit 221 performs reading. Note that the second reading unit 221 may read the RFID tag after the store leaving code is read by the first reading unit 211, but preferably, the RFID tag may be read in a case where the imaging unit (first reading unit 211) of the information processing apparatus 210 detects the user. The second reading unit 221 may constantly emit reading radio waves. In S705, the second reading unit 221 determines whether reading has been normally performed. In a case where the reading has not been normally performed (S705, No), the display unit 212 displays an RFID reading error on the display screen in S706. Note that, for example, other error notifications may be used as long as the user can recognize the error, such as generating an error sound. The reading of the RFID tag (S704) is repeated until the reading is normally performed.

In a case where the RFID is normally read (S705, Yes), in S707, the collation unit 222 collates (compares) the identification information of the product for which payment is completed included in the payment information that can be referred to from the store leaving code with the identification information of the product read by the second reading unit 221. In a case where the identification information of the product for which payment is completed and the read identification information of the product match each other without excess or deficiency, a collation result is normal (S708, Yes), and thus, the collation unit 222 outputs a signal indicating that the collation result is normal to the information processing apparatus 210, and in S709, the display unit 212 of the information processing apparatus 210 displays a completion notification of the store leaving process. On the other hand, in a case where a collation result is not normal (S708, No), the collation unit 222 outputs a signal indicating that the collation result is an error to the information processing apparatus 210, and the display unit 212 of the information processing apparatus 210 displays an error notification in S710. The processing is ended.

Note that the above-described store leaving process can also be applied to a case where accounting is performed by an accounting machine in a store. In a case where accounting is performed by the accounting machine in the store, a store leaving code generated (issued) by performing accounting with the accounting machine in the store may be used.

FIG. 20 is a diagram illustrating an example of a display screen of the information processing apparatus 210 at the time of the store leaving process. FIG. 20(A) is a diagram illustrating an example of a store leaving code scan screen 720. The store leaving code scan screen 720 includes guide display 721 for scanning a store leaving code and a scan region 722 for reading the store leaving code. The guide display 721 is performed such that the user can intuitively understand a method of scanning the store leaving code. The store leaving code is located in the scan region 722, and the first reading unit 211 images the store leaving code to read the store leaving code (S701). For example, a scan frame 723 may be displayed on the store leaving code scan screen 720. In a case where the scan frame 723 is displayed, the scan frame 723 can be used as an index related to a position where the store leaving code is to be located, and the user can more easily scan the store leaving code. FIG. 20(B) is a diagram illustrating an example of a screen 730 after completion of the reading of the store leaving code. When the reading of the store leaving code has been normally completed, the screen 730 is displayed. On the screen 730, all the product names 731 of the products included in the payment information acquired by the information processing apparatus 210 reading the store leaving code and a total number (payment number) 732 of the products are displayed. FIG. 20(C) is a diagram illustrating an example of a screen 740 after the second reading unit 221 of the gate apparatus 220 completes reading of the RFID tag. In a case where the reading of the RFID tag by the second reading unit 221 of the gate apparatus 220 is normally completed, the screen 740 is displayed. For example, an icon 741 indicating that the collation result is normal is displayed beside a product name corresponding to the product read by the second reading unit 221 among all the product names 731 of the products included in the payment information. On the screen 740, a total number (carry-out number) 742 of the products for which the reading of the RFID tag is completed is displayed. In a case where a collation result between the payment information and the identification information of the product to be carried out is normal, a screen 750 is displayed. FIG. 20(D) is a diagram illustrating an example of a collation completion screen. The screen 750 in FIG. 20(D) illustrates an example in which a collation result is normal. Note that, in a case where a collation result is an error, it is preferable to perform emphasis display of the product name 731 of which identification information does not match, in other words, the product name 731 causing an error, for example, by highlighting a color, performing surrounding display with a frame line, or performing blinking. Note that emphasis display is not limited to this, and may be any display that can be easily visually recognized by the user. With such a configuration, the user can easily ascertain which product is the cause of the error.

FIG. 21 is a diagram for describing a collation result in S707. In the present embodiment, as an example, a collation result of five patterns will be described. Note that the product identification information illustrated in this drawing (table) is simply written for ease of description. In the identification information, the alphabet letters (A, B, C, and D) indicate types of products, and indicate type information attached to respective stock keeping units (SKU). The numerical portions ("001" and "002") indicate numbers uniquely assigned to respective individual products.

Pattern 1 is a case where payment information and RFID read information (carry-out information) completely match. In pattern 1, a total number of products and identification information of each product in the payment information and the carry-out information completely match. In this case, the collation unit 222 determines that the collation result is "normal". In this case, for example, the screen 750 illustrated in FIG. 20(D) is displayed on the display unit 212 of the information processing apparatus 210, and the user can leave the gate apparatus 220 and leave the store.

In pattern 2, the number of products included in the carry-out information is smaller than the number of products included in the payment information. Specifically, in the present example, the carry-out information does not include the identification information of "C001". In this case, the collation unit 222 determines that the collation result is "error". In this case, there is a possibility that the user has mislaid the product in the store. Therefore, for example, an error message such as "The number of products is not sufficient. Please check the product." is displayed on the display unit 212 of the information processing apparatus 210.

In pattern 3, the number of products included in the carry-out information is larger than the number of products included in the payment information. Specifically, in the present example, the identification information of "C002" not included in the payment information is included in the carry-out information. In this case, the collation unit 222 determines that the collation result is "error". In this case, there is a possibility that the user carries out a product for which payment is not completed. Therefore, for example, an error message such as "You seem to have something other than the product for which payment has been made. A staff member will be called and please check" on the display unit 212 of the information processing apparatus 210.

In pattern 4, the number of products in the payment information and the number of products in the carry-out information are the same, but the types of some products do not match. Specifically, in the present example, the type of product of "C001" in the payment information and the type of product of "D001" in the carry-out information are different. This means that the user intends to carry out a different type of product from the product for which payment has been completed. In this case, the collation unit 222 determines that the collation result is "error". In this case, there may be a possibility that the user carries out a wrong product. Therefore, for example, an error message such as "You seem to have something other than the product for which payment has been made. A staff member will be called and please check" on the display unit 212 of the information processing apparatus 210.

In pattern 5, the number of products in the payment information and the number of products in the carry-out information are the same, but the identification information of the products does not match. However, the type information of the product matches. Specifically, in the present example, the identification information "C001" in the payment information is different from the identification information "C002" in the carry-out information, but "C" that is type information is the same. This means that the user carries out a different individual although the product is of the same type as the product for which payment has been completed. That is, the product "C001" and the product "C002" are exactly the same in the product type (one or more of a product number, a color, a size, and a price), and only different in individual. In this case, the collation unit 222 determines that the collation result is "normal", and for example, displays the screen 750 illustrated in FIG. 20(D) on the display unit 212 of the information processing apparatus 210 similarly to pattern 1. In this case, the gate system 200 outputs, for example, identification information (here, "C001" and "C002") that does not match to the store server 300. The store server 300 preferably rewrites the identification information that does not match, for example, by exchanging the identification information. With such a process, it is possible to reduce unnecessary hindrance of the user's leaving the store.

With such a configuration, the user can efficiently check whether correct payment for the held product has been performed.

[Other Embodiments]

In the above-described embodiment, the gate system 200 includes the separate information processing apparatus 210 and gate apparatus 220, but the information processing apparatus 210 and the gate apparatus 220 may be integrated. The first reading unit 211 may be disposed near the entrance of the gate apparatus 220.

Although the embodiments of the present application have been described in detail with reference to some drawings, the above embodiments are examples for describing the present invention, and are not intended to limit the present invention only to these embodiments. The present invention can be implemented in various forms without departing from the spirit thereof. In a case where the processes in the mobile terminal 100, the information processing apparatus 210, the gate apparatus 220, and the store server 300 are realized by a computer, processing content of functions that are required to be included in each unit of these apparatuses are executed on the basis of a program. The program describing the above-described processing content can be recorded in a computer-readable recording medium. The computer-readable recording medium may be any recording medium such as a magnetic recording device, an optical disc, a magneto-optical recording medium, or a semiconductor memory. The processes of each unit may be configured by executing a predetermined program on a computer.

REFERENCE SIGNS LIST

1 Purchase support system
10 Network
100 Mobile terminal
103 Display unit
104 Trigger receiving unit
105 Processing unit
200 Gate system
210 Information processing apparatus
212 Display unit
220 Gate apparatus
222 Collation unit
223a First side wall portion
223b Second side wall portion
224 Placement portion
225 Light emitting unit
226 Metal member
227 Passage
300 Store server
301 Store information database

The invention claimed is:

1. A gate system comprising:
an information processing apparatus including a first reading unit configured to read a store leaving code to acquire first identification information for individually identifying a product for which a payment process has been completed; and
a gate apparatus communicatively connected to the information processing apparatus,
wherein the gate apparatus includes:
a pair of side wall portions that are disposed to face each other with a passage interposed therebetween;
a second reading unit that is provided on at least one of the pair of side wall portions and configured to output predetermined radio waves to read, from an RFID tag attached to the product, second identification information for individually identifying a product that has passed through the passage; and
a placement portion on which the information processing apparatus is placed,
wherein the placement portion is disposed above a reading region of the second reading unit.

2. The gate system according to claim 1, wherein the placement portion is disposed near a center of one of the pair of side wall portions in a direction along the passage.

3. The gate system according to claim 1, further comprising a metal member that is disposed on a floor surface near an entrance and an exit of the passage.

4. The gate system according to claim 1, wherein the second reading unit is disposed at a position where a range of a height of at least 90 cm from a floor surface of the passage is a reading region.

5. The gate system according to claim 1, further comprising a light emitting unit on one of an entrance side and an exit side of the pair of side wall portions.

6. The gate system according to claim 1, further comprising:
 a control unit configured to control the second reading unit, wherein
 the control unit causes the second reading unit to start outputting the radio waves in a case where the first reading unit detects a user.

7. The gate system according to claim 1, wherein the information processing apparatus includes a display unit that displays a collation result between the first identification information and the second identification information.

8. A control method of a gate system, the control method comprising:

reading a store leaving code to acquire first identification information for individually identifying a product for which a payment process has been completed, by a first reading unit;

reading second identification information for individually identifying a product that has passed through the passage from an RFID tag attached to the product, by a second reading unit that is provided on at least one of a pair of side wall portions that are disposed to face each other with a passage interposed therebetween and configured to output predetermined radio waves to read; and displaying a collation result between the first identification information and the second identification information on a display unit, wherein the display unit is disposed above a reading region of the second reading unit.

9. The control method according to claim 8, wherein the first reading unit is disposed at the same position as or in the vicinity of the display unit.

* * * * *